(12) United States Patent
Duffy et al.

(10) Patent No.: US 11,799,887 B2
(45) Date of Patent: Oct. 24, 2023

(54) SYSTEMS AND METHODS FOR INTELLIGENTLY GENERATING CYBERSECURITY CONTEXTUAL INTELLIGENCE AND GENERATING A CYBERSECURITY INTELLIGENCE INTERFACE

(71) Applicant: Expel, Inc., Herndon, VA (US)

(72) Inventors: Patrick Duffy, Annandale, VA (US); Kelsey Mitchell, Arlington, VA (US); Peter Silberman, Rockville, MD (US)

(73) Assignee: Expel, Inc., Herndon, VA (US)

( * ) Notice: Subject to any disclaimer, the term of this patent is extended or adjusted under 35 U.S.C. 154(b) by 0 days.

(21) Appl. No.: 18/095,754

(22) Filed: Jan. 11, 2023

(65) Prior Publication Data
US 2023/0224312 A1  Jul. 13, 2023

Related U.S. Application Data

(60) Provisional application No. 63/298,434, filed on Jan. 11, 2022.

(51) Int. Cl.
*H04L 9/40* (2022.01)
*H04L 41/22* (2022.01)

(52) U.S. Cl.
CPC .......... *H04L 63/1416* (2013.01); *H04L 41/22* (2013.01); *H04L 63/20* (2013.01)

(58) Field of Classification Search
None
See application file for complete search history.

(56) References Cited

U.S. PATENT DOCUMENTS 9,716,617 B1 * 7/2017 Ahuja ................. H04L 41/0803
2018/0083985 A1 * 3/2018 Ahuja ................. H04L 63/0227
2019/0320038 A1 * 10/2019 Walsh ..................... H04L 65/65
(Continued)

*Primary Examiner* — Joseph P Hirl
*Assistant Examiner* — Hassan Saadoun
(74) *Attorney, Agent, or Firm* — Padowithz Alce; Chandler Scheitlin; Alce PLLC

(57) ABSTRACT

A system and method for adapting one or more cybersecurity microservices to accelerate cybersecurity threat mitigation includes constructing a subscriber-specific data corpus comprising a plurality of distinct pieces of computing environment-informative data of a target subscriber; adapting a subscriber-agnostic microservice of the cybersecurity service to a subscriber-specific microservice, wherein: the subscriber-agnostic microservice includes a plurality of subscriber-agnostic cybersecurity event handling instructions, and adapting the subscriber-agnostic microservice to the subscriber-specific microservice includes generating a plurality of context-informed cybersecurity event handling instructions; augmenting the subscriber-agnostic microservice to include the plurality of context-informed cybersecurity event handling instructions; computing for a target cybersecurity event a subscriber-specific threat severity level based on one or more of the plurality of context-informed cybersecurity event handling instructions; executing, by one or more computers, a threat mitigation action or threat disposal action based on the computing of the subscriber-specific threat severity level for the target cybersecurity event.

20 Claims, 20 Drawing Sheets

(56) References Cited

U.S. PATENT DOCUMENTS

| | | | |
|---|---|---|---|
| 2021/0126948 A1* | 4/2021 | Nedbal | H04L 63/20 |
| 2021/0306321 A1* | 9/2021 | Calegari | H04L 63/108 |
| 2022/0311783 A1* | 9/2022 | Meena | H04L 63/1408 |
| 2023/0004650 A1* | 1/2023 | Chapman | G06F 21/54 |

* cited by examiner

Constructing a Subscriber-Specific Data Corpus and a Cohort-Specific Data Corpus S210

Computing Alert Handling Metrics for a Target Subscriber based on the Subscriber-Specific Data Corpus S220

Generating one or more Graphical Schematics and/or one or more Textual Schematics based on the Subscriber-Specific Data Corpus S230

Generating an Intelligent Service Review Interface that includes one or more Alert Handling Metrics, one or more Graphical Schematics, and/or one or more Textual Schematics S240

SYSTEMS AND METHODS FOR INTELLIGENTLY GENERATING CYBERSECURITY CONTEXTUAL INTELLIGENCE AND GENERATING A CYBERSECURITY INTELLIGENCE INTERFACE

CROSS-REFERENCE TO RELATED APPLICATIONS

This application claims the benefit of U.S. Provisional Application No. 63/298,434, filed 11 Jan. 2022, which is incorporated in its entirety by this reference.

TECHNICAL FIELD

This invention relates generally to the cybersecurity field, and more specifically to a new and useful cyber threat detection and mitigation system and methods in the cybersecurity field.

BACKGROUND

Modern computing and organizational security have been evolving to include a variety of security operation services that can often abstract a responsibility for monitoring and detecting threats in computing and organizational resources of an organizational entity to professionally managed security service providers outside of the organizational entity. As many of these organizational entities continue to migrate their computing resources and computing requirements to cloud-based services, the security threats posed by malicious actors appear to grow at an incalculable rate because cloud-based services may be accessed through any suitable Internet or web-based medium or device throughout the world.

Thus, security operation services may be tasked with mirroring the growth of these security threats and correspondingly, scaling their security services to adequately protect the computing and other digital assets of a subscribing organizational entity. However, because the volume of security threats may be great, it may present one or more technical challenges in scaling security operations services without resulting in a number of technical inefficiencies that may prevent or slowdown the detection of security threats and efficiently responding to detected security threats.

Thus, there is a need in the cybersecurity field to create improved systems and methods for intelligently scaling threat detection capabilities of a security operations service while improving its technical capabilities to efficiently respond to an increasingly large volume of security threats to computing and organizational computing assets. Furthermore, there is a need in the art to intelligently communicate and receive subscriber-based insight for system-detected security threats potentially occurring within an environment of the subscribing organizational entity.

The embodiments of the present application described herein provide technical solutions that address, at least the need described above.

BRIEF SUMMARY OF THE INVENTION(S)

In one embodiment, a method for intelligently adapting one or more cybersecurity microservices of a cybersecurity service to accelerate cybersecurity threat mitigation includes constructing a subscriber-specific data corpus comprising a plurality of distinct pieces of computing environment-informative data associated with one or more computing environments of a target subscriber; adapting a subscriber-agnostic microservice of the cybersecurity service to a subscriber-specific microservice based on the subscriber-specific data corpus, wherein: the subscriber-agnostic microservice includes a plurality of distinct subscriber-agnostic cybersecurity event handling instructions, and the adapting the subscriber-agnostic microservice to the subscriber-specific microservice includes generating a plurality of distinct context-informed cybersecurity event handling instructions based on at least a subset of the plurality of distinct pieces of computing environment-informative data of the target subscriber; and augmenting the subscriber-agnostic microservice to include the plurality of distinct context-informed cybersecurity event handling instructions; routing, to the subscriber-specific microservice, a target cybersecurity event that includes a plurality of distinct pieces of event data; and based on the routing, computing for the target cybersecurity event one of: a subscriber-specific threat severity level based on one or more of the plurality of distinct context-informed cybersecurity event handling instructions if at least one piece of event data of the target cybersecurity event is equivalent to one of the plurality of distinct pieces of computing environment-informative data of the subscriber-specific data corpus; and a subscriber-agnostic threat severity level based on one or more of the plurality of distinct subscriber-agnostic cybersecurity event handling instructions if each piece of event data of the plurality of distinct pieces of event data is excluded from the subscriber-specific data corpus; and executing, by one or more computers, a threat mitigation action or threat disposal action that resolves or mitigates a threat of the target cybersecurity event based on the computing of the subscriber-specific threat severity level or the subscriber-agnostic threat severity level for the target cybersecurity event.

In one embodiment, the method includes wherein: a subset of the plurality of distinct pieces of computing environment-informative data of the subscriber-specific data corpus includes one or more critical cybersecurity entities of the target subscriber; and the generating the plurality of distinct context-informed cybersecurity event handling instructions includes creating at least one cybersecurity event handling instruction that, when executed, causes an automatic escalation of a threat severity level of a suspect cybersecurity event that involves the one or more critical cybersecurity entities.

In one embodiment, the method includes a subset of the plurality of distinct pieces of computing environment-informative data of the subscriber-specific data corpus includes one or more non-critical cybersecurity entities of the target subscriber; and the generating the plurality of distinct context-informed cybersecurity event handling instructions includes creating at least one cybersecurity event handling instruction that, when executed, causes an automatic de-escalation of a threat severity level of a suspect cybersecurity event that involves the one or more non-critical cybersecurity entities.

In one embodiment, the method includes wherein a subset of the plurality of distinct pieces of computing environment-informative data of the subscriber-specific data corpus includes one or more temporary user location adjustments for one or more digital users associated with the target subscriber; and the generating the plurality of distinct context-informed cybersecurity event handling instructions includes creating at least one ephemeral cybersecurity event handling instruction that, when executed, causes an automatic escalation or de-escalation of a threat severity level of a suspect cybersecurity event that involves the one or more temporary location adjustments.

In one embodiment, the method includes wherein a subset of the plurality of distinct pieces of computing environment-informative data of the subscriber-specific data corpus includes one or more critical cybersecurity entities of the target subscriber; and the generating the plurality of distinct context-informed cybersecurity event handling instructions includes creating at least one cybersecurity event handling instruction that, when executed, automatically activates an automated remediations microservice of the cybersecurity service that automatically remediates or mitigates a suspect cybersecurity event that involves the one or more critical cybersecurity entities.

In one embodiment, the method includes wherein a subset of the plurality of distinct pieces of computing environment-informative data of the subscriber-specific data corpus includes one or more non-critical cybersecurity entities of the target subscriber; and the generating the plurality of distinct context-informed cybersecurity event handling instructions includes creating at least one cybersecurity event handling instruction that, when executed, causes an automatic suppression of a suspect cybersecurity event that involves the one or more non-critical cybersecurity entities.

In one embodiment, the method includes wherein one piece of event data of the target cybersecurity event is equivalent to one of the plurality of distinct pieces of computing environment-informative data of the subscriber-specific data corpus, the method further includes: displaying, via a web-accessible user interface, the target cybersecurity event that includes the plurality of distinct pieces of event data; and visually emphasizing the one piece of event data based on the one piece of event data being equivalent to the one of the plurality of distinct pieces of computing environment-informative data of the subscriber-specific data corpus.

In one embodiment, the method includes wherein each distinct piece of computing environment-informative data of the plurality of distinct pieces of computing environment-informative data includes one or more strings of subscriber-informed text, the method further comprising: based on receiving a subscriber input directed to the one piece of event data, displaying a contextual intelligence graphical user interface that is overlaid on the web-accessible user interface that includes the one or more strings of subscriber-informed text associated with the one piece of event data.

In one embodiment, the method further includes mitigating, via an execution of one or more cybersecurity threat mitigation actions, a threat of the target cybersecurity event based on an evaluation of the contextual intelligence graphical user interface.

In one embodiment, the method further includes routing the target cybersecurity event to a cybersecurity event disposal queue based on an evaluation of the contextual intelligence graphical user interface.

In one embodiment, a method for intelligently adapting one or more cybersecurity microservices of a cybersecurity service to accelerate cybersecurity threat mitigation includes identifying a subscriber-specific data corpus comprising a plurality of distinct pieces of computing environment-informative data associated with one or more computing environments of a target subscriber; adapting a subscriber-agnostic microservice of the cybersecurity service to a subscriber-specific microservice based on the subscriber-specific data corpus, wherein: the subscriber-agnostic microservice includes a plurality of distinct subscriber-agnostic cybersecurity event handling instructions, and the adapting the subscriber-agnostic microservice to the subscriber-specific microservice includes: generating a plurality of distinct context-informed cybersecurity event handling instructions based on at least a subset of the plurality of distinct pieces of computing environment-informative data of the target subscriber; and augmenting the subscriber-agnostic microservice to include the plurality of distinct context-informed cybersecurity event handling instructions; accessing the subscriber-specific microservice based on identifying a target cybersecurity event that includes a plurality of distinct pieces of event features, wherein the accessing includes assessing a subset of the plurality of distinct pieces of event features against the context-informed cybersecurity event handling instructions; and automatically executing one or more of the plurality of distinct context-informed cybersecurity event handling instructions based on the assessment that resolves or mitigates a threat of the target cybersecurity event.

In one embodiment, the method includes wherein automatically executing the one or more of the plurality of distinct context-informed cybersecurity event handling instructions is further based on at least one event feature of the target cybersecurity event being equivalent to one of the plurality of distinct pieces of computing environment-informative data of the subscriber-specific data corpus.

In one embodiment, the method further includes constructing the subscriber-specific data corpus during an enrollment of the target subscriber to the cybersecurity service, wherein the constructing includes: sourcing the plurality of distinct pieces of computing environment-informative data via one or more graphical user interfaces of the cybersecurity service; attributing a data context type to each distinct piece of computing environment-informative data sourced from the one or more graphical user interfaces of the cybersecurity service; and assigning one or more subscriber-informed environment context attributes to each distinct piece of computing environment-informative data sourced from the one or more graphical user interfaces of the cybersecurity service.

In one embodiment, the method further includes augmenting the subscriber-specific data corpus to include an additional piece of computing environment-informative data based on a cybersecurity investigation of a target cybersecurity alert; and augmenting the subscriber-agnostic microservice to include an additional context-informed cybersecurity event handling instruction based on the additional piece of computing environment-informative data.

In one embodiment, the method further includes displaying, by one or more computers, a cybersecurity intelligence graphical user interface, wherein a first distinct region of the cybersecurity intelligence graphical user interface includes a first subset of the plurality of distinct pieces of computing environment-informative data of the subscriber-specific data corpus; and a first selectable hyperlink that, when selected, displays an algorithmic structure of one of the plurality of distinct context-informed cybersecurity event handling instructions generated based on the first subset.

In one embodiment, the method includes wherein the cybersecurity intelligence graphical user interface further includes a second distinct region, wherein the second distinct region includes a second subset of the plurality of distinct pieces of computing environment-informative data of the subscriber-specific data corpus; and a second selectable hyperlink that, when selected, displays an algorithmic structure of one of the plurality of distinct context-informed cybersecurity event handling instructions that corresponds to the second subset.

In one embodiment, the method includes wherein a subset of the plurality of distinct pieces of computing environment-informative data of the subscriber-specific data corpus includes one or more critical cybersecurity entities of the target subscriber; and the generating the plurality of distinct context-informed cybersecurity event handling instructions includes creating at least one cybersecurity event handling instruction that, when executed, causes an automatic escalation of a suspect cybersecurity event that involves the one or more critical cybersecurity entities.

In one embodiment, the method includes wherein a subset of the plurality of distinct pieces of computing environment-informative data of the subscriber-specific data corpus includes one or more non-critical cybersecurity entities of the target subscriber; and the generating the plurality of distinct context-informed cybersecurity event handling instructions further includes creating at least one cybersecurity event handling instruction that, when executed, causes an automatic de-escalation a suspect cybersecurity event that involves the one or more non-critical cybersecurity entities.

In one embodiment, the method includes wherein the generating the plurality of distinct context-informed cybersecurity event handling instructions further includes creating at least one cybersecurity event handling instruction that, when executed, automatically remediates, or mitigates the suspect cybersecurity event that involves the one or more critical cybersecurity entities.

In one embodiment, a computer-implemented method for intelligently adapting one or more cybersecurity microservices of a cybersecurity service to accelerate cybersecurity threat mitigation includes constructing, by one or more computers, a subscriber-specific data corpus comprising a plurality of distinct pieces of computing environment-informative data associated with one or more computing environments of a target subscriber; automatically transforming, by the one or more computers, a subscriber-agnostic cybersecurity event detection microservice of the cybersecurity service to a subscriber-specific cybersecurity event detection microservice based on the subscriber-specific data corpus, wherein the transforming the subscriber-agnostic microservice to the subscriber-specific microservice includes installing a plurality of distinct context-informed cybersecurity event handling instructions into the subscriber-agnostic cybersecurity event detection microservice; accessing the subscriber-specific microservice based on identifying a target cybersecurity event that includes a plurality of distinct pieces of event features, wherein the accessing includes assessing a subset of the plurality of distinct pieces of event features against the context-informed cybersecurity event handling instructions; and automatically executing, by the one or more computers, one or more of the plurality of distinct context-informed cybersecurity event handling instructions based on the assessment to resolve or mitigate a threat of the target cybersecurity event.

BRIEF DESCRIPTION OF THE FIGURES

FIG. 2 illustrates an example method 200 in accordance with one or more embodiments of the present application;

FIGS. 7-19 illustrate exemplarily user interfaces in accordance with one or more embodiments of the present application.

DESCRIPTION OF THE PREFERRED EMBODIMENTS

The following description of the preferred embodiments of the inventions are not intended to limit the inventions to these preferred embodiments, but rather to enable any person skilled in the art to make and use these inventions.

1. System for Remote Cyber Security Operations & Automated Investigations

Figure 1:
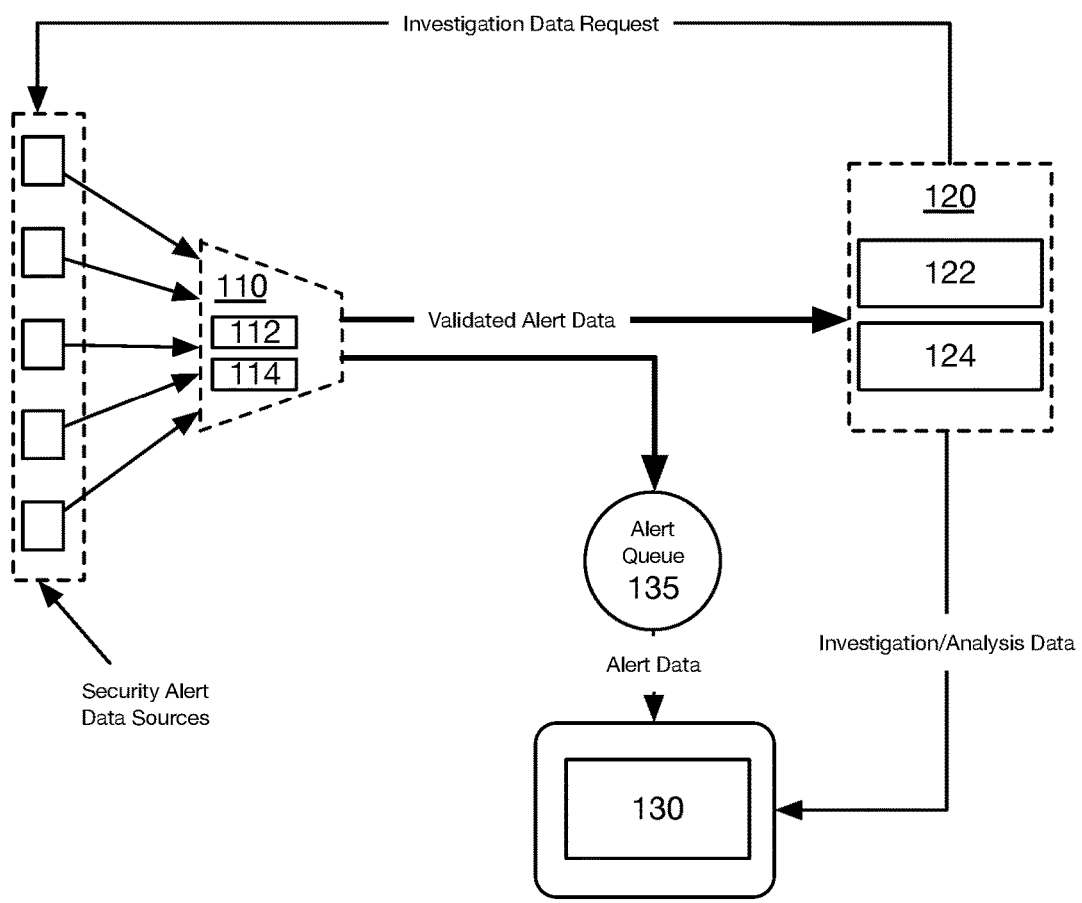
FIG. 1 illustrates a schematic representation of a system 100 in accordance with one or more embodiments of the present application.

As shown in FIG. 1, a system 100 for implementing remote cybersecurity operations includes a security alert engine 110, an automated security investigations engine 120, and a security threat mitigation user interface 130. The system 100 may sometimes be referred to herein as a cybersecurity threat detection and threat mitigation system 100 or a cybersecurity event detection and response service 100.

The system 100 may function to enable real-time cybersecurity threat detection, agile, and intelligent threat response for mitigating detected security threats.

1.1 Security Alert Engine

The security alert aggregation and identification module no, sometimes referred to herein as the "security alert engine 110" may be in operable communication with a plurality of distinct sources of cyber security alert data. In one or more embodiments, the module no may be implemented by an alert application programming interface (API) that may be programmatically integrated with one or more APIs of the plurality of distinct sources of cyber security alert data and/or native APIs of a subscriber to a security service implementing the system 100.

In one or more embodiments, the security alert engine no may include a security threat detection logic module 112 that may function to assess inbound security alert data using predetermined security detection logic that may validate or substantiate a subset of the inbound alerts as security threats requiring an escalation, an investigation, and/or a threat mitigation response by the system 100 and/or by a subscriber to the system 100.

Additionally, or alternatively, the security alert engine 100 may function as a normalization layer for inbound security alerts from the plurality of distinct source of security alert data by normalizing all alerts into a predetermined alert format.

1.1.1 Security Alert Machine Learning System

Optionally, or additionally, the security alert engine 11o may include a security alert machine learning system 114 that may function to classify inbound security alerts as validated or not validated security alerts, as described in more detail herein.

The security alert machine learning system 114 may implement a single machine learning algorithm or an ensemble of machine learning algorithms. Additionally, the security alert machine learning system 114 may be implemented by the one or more computing servers, computer processors, and the like of the artificial intelligence virtual assistance platform 110.

The machine learning models and/or the ensemble of machine learning models of the security alert machine learning system 114 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be used in implementing the security alert machine learning system 114 and/or other components of the system 100.

1.2 Automated Investigations Engine

The automated security investigations engine 120, which may be sometimes referred to herein as the "investigations engine 120", preferably functions to automatically perform investigative tasks for addressing a security task and/or additionally, resolve a security alert. In one or more embodiments, the investigations engine 120 may function to automatically resolve a security alert based on results of the investigative tasks.

In one or more embodiments, the investigations engine 120 may include an automated investigation workflows module 122 comprising a plurality of distinct automated investigation workflows that may be specifically configured for handling distinct security alert types or distinct security events. Each of the automated investigation workflows preferably includes a sequence of distinct investigative and/or security data production tasks that may support decisioning on or a disposal of a validated security alert. In one or more embodiments, the investigations engine 120 may function to select or activate a given automated investigation workflow from among the plurality of distinct automated investigation workflows based on an input of one or more of validated security alert data and a security alert classification label.

Additionally, or alternatively, the investigations engine 120 may include an investigations instructions repository 124 that includes a plurality of distinct investigation instructions/scripts or investigation rules that inform or define specific investigation actions and security data production actions for resolving and/or addressing a given validated security alert. In one or more embodiments, the investigations instructions repository 124 may be dynamically updated to include additional or to remove one or more of the plurality of distinct investigation instructions/scripts or investigation rules.

1.3 Security Threat Mitigation User Interface

The security threat mitigation user interface 130 (e.g., Workbench) may function to enable an analyst or an administrator to perform, in a parallel manner, monitoring, investigations, and reporting of security incidents and resolutions to subscribers to the system 100 and/or service implementing the system 100. In some embodiments, an operation of the security user interface 130 may be transparently accessible to subscribers, such that one or more actions in monitoring, investigation, and reporting security threats or security incidents may be surfaced in real-time to a user interface accessible to a subscribing entity.

Accordingly, in or more embodiments, a system user (e.g., an analyst) or an administrator implementing the security threat mitigation user interface 130 may function to make requests for investigation data, make requests for automated investigations to the automated investigations engine 120, obtain security incident status data, observe or update configuration data for automated investigations, generate investigation reports, and/or interface with any component of the system 100 as well as interface with one or more systems of a subscriber.

Additionally, or alternatively, in one or more embodiments, the security threat mitigation user interface 130 may include and/or may be in digital communication with a security alert queue 135 that stores and prioritizes validated security alerts.

2. Method for Generating Cybersecurity Contextual Intelligence and Generating a Cybersecurity Intelligence Interface As shown in FIG. 2, a method 200 for generating cybersecurity contextual intelligence and generating a cybersecurity intelligence graphical user interface may include identifying a subscriber-specific alert/event data corpus and a cohort-specific alert/event data corpus S210, computing one or more cybersecurity alert or cybersecurity event handling metrics for a target subscriber based on the subscriber-specific alert/event data corpus S220, generating one or more graphical contextual intelligence schematics and/or one or more textual contextual intelligence schematics based on the subscriber-specific alert/event data corpus S230, and constructing a cybersecurity intelligence interface that includes one or more of the alert handling metrics, one or more of the graphical schematics, and/or one or more of the textual schematics S240.

2.10 Constructing a Subscriber-Specific Event/Alert Data Corpus and a Subscriber Context Data Corpus S210, which includes constructing a subscriber-specific data corpus and a cohort-specific data corpus, may function to collect and aggregate alert data and/or event data associated with a target time period for a target subscriber and, optionally, for a plurality of reference subscribers that may share one or more target characteristics with the target subscriber. In a preferred embodiment, S210 may function to a build a first corpus of alert/event data for a target subscriber (may also be referred to herein as "subscriber-specific alert/event data corpus") by collecting system-validated security alert data, raw alert data, and/or raw event data associated with the target subscriber for a target time period, and S210 may additionally function to build a second corpus of alert/event data for a plurality of reference subscribers that may share one or more target characteristics with the target subscriber (may also be referred to herein as "cohort-specific alert/event data corpus") by collecting system-validated security alert data, raw alert data, and/or raw event data associated with each of the plurality of reference subscribers for the same target period of time used to construct the subscriber-specific alert/event data corpus.

It shall be noted that a system-validated security alert, as referred to herein, may preferably relate to a generated or published security alert from a security alert engine, as described in U.S. Patent Application No. 63/159,895, filed on 11 Mar. 2021, tiled SYSTEMS AND METHODS FOR INTELLIGENT CYBERSECURITY THREAT DETECTING AND INTELLIGENT VERIFICATION MESSAGES THROUGH AUTOMATED WORKFLOWS, which is incorporated in its entirety by this reference.

Subscriber-Specific Data Corpus

As briefly mentioned above, in a preferred embodiment, S210 may function to build a subscriber-specific alert/event data corpus for a target subscriber by collecting and/or aggregating system-validated security alerts, raw alert data, and/or raw event data that may have historically occurred in an environment of the target subscriber during a target time period. The target time period (e.g., a target week, a target month, a target quarter, or a target year) may define the parameters for building a subscriber-specific alert/event data corpus as the target time period may inform S210 of the system-validated security alerts, the raw alert data, and/or the raw event data to collect and include in the subscriber-specific alert/event data corpus.

Additionally, in some embodiments, for each collected or identified system-validated security alert, raw alert data, and/or raw event data included in a subscriber-specific alert/event data corpus, S210 may function to additionally collect and/or identify system handling/management data (e.g., investigation handling/management data, remediation data, etc.) associated with the each collected piece of alert/event data. In other words, for each identified or collected piece of alert/event data (e.g., each system-validated security alert data, each piece of raw alert data, each piece raw event data) included in the subscriber-specific alert/event data corpus, S210 may additionally function to collect additional alert data associated with one or more lifecycle stages of an alert handling/alert management process.

Subscriber-Specific Context Corpus

Figure 3:
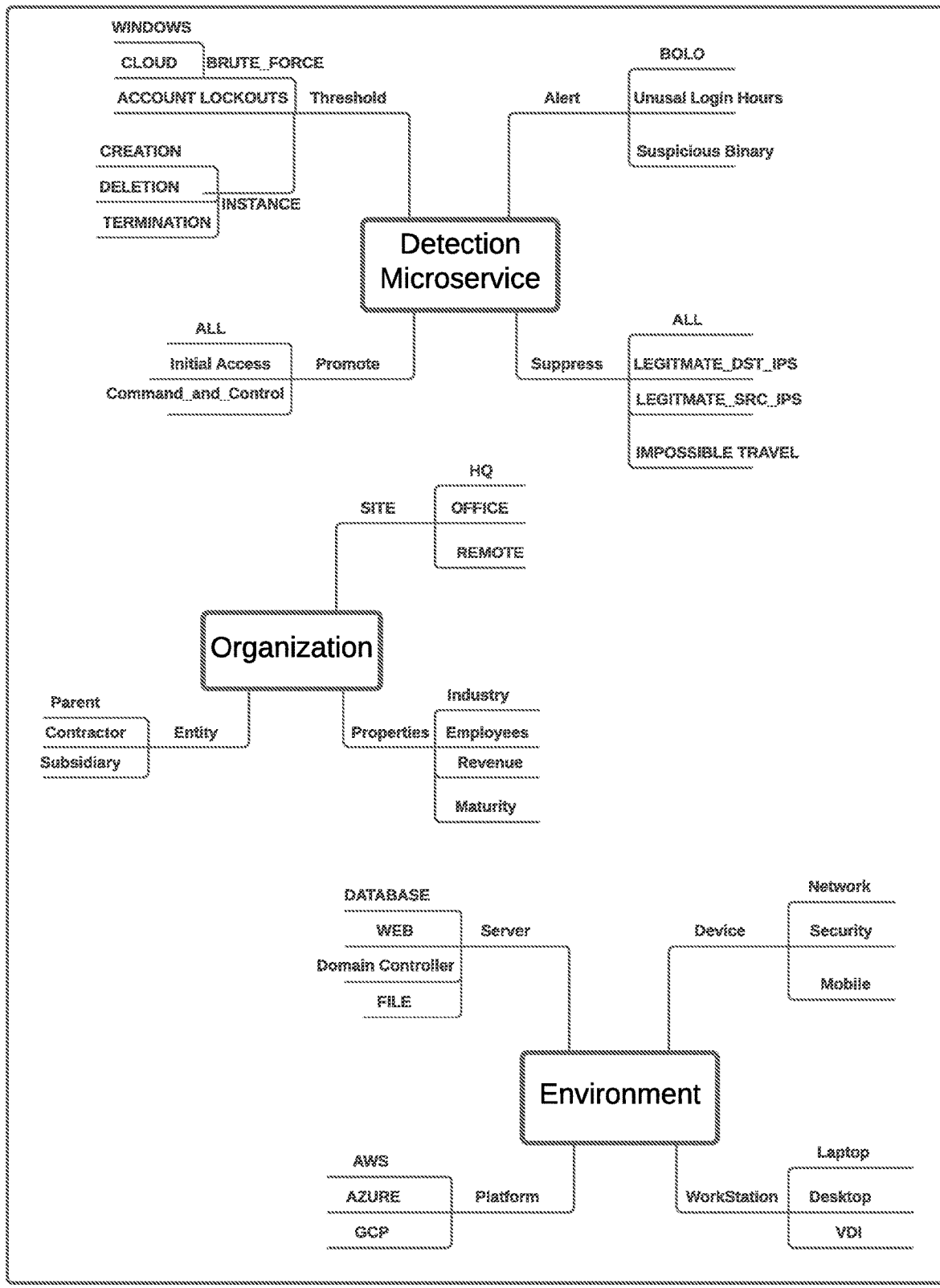
FIG. 3 illustrates an example representation of a cybersecurity configuration framework of a target subscriber in accordance with one or more embodiments of the present application.
Figure 6:
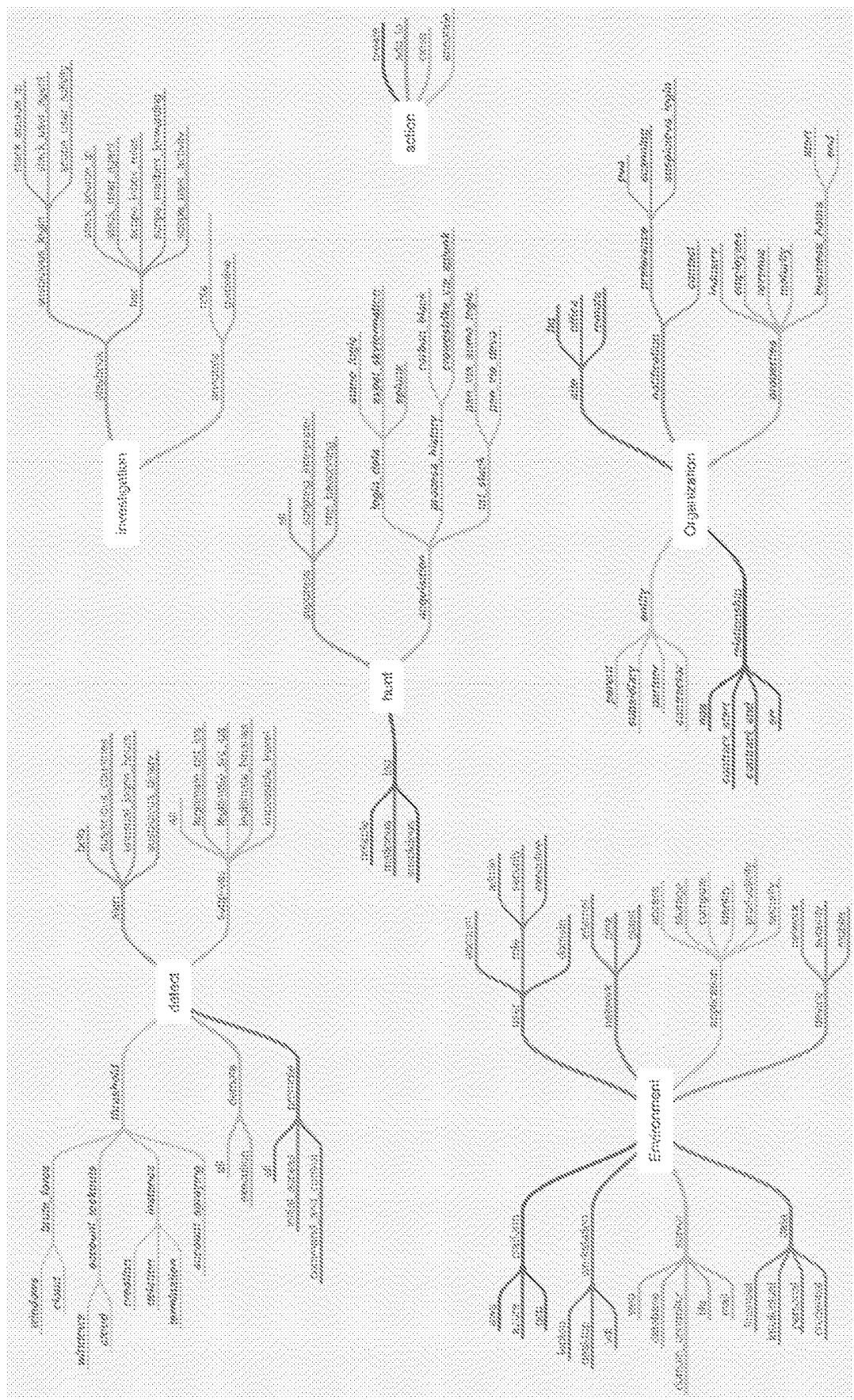
FIG. 6 illustrates an example representation of a plurality of distinct cybersecurity microservices and an environmental context data repository.

Additionally, or alternatively, S210 may function to identify and/or obtain subscriber-context data. In one or more embodiments, subscriber-context data may include a collection of subscriber-specific cybersecurity tasks, and data relating to secured digital/computing assets of a target subscriber. A subscriber-specific cybersecurity task, as referred to herein, preferably relates to a subscriber-generated or a subscriber-defined request for a performance of a cybersecurity operation that extends a scope of an existing cybersecurity service of a system (e.g., system $1oo$) or a cybersecurity service implementing the method 200, as shown generally by way of example in FIG. 3 and FIG. 6.

In one or more embodiments, a system implementing the method 200 or the like may function to derive, based on the subscriber-specific cybersecurity tasks, one or more tuning and/or configuration parameters that, when executed, reconfigure one or more operational attributes of existing cybersecurity services (of the system $1oo$) for addressing one or more cybersecurity requirements of the subscriber-specific cybersecurity tasks. In some embodiments, subscriber-specific cybersecurity tasks may inform alert/event data collection, cybersecurity metric computations, and/or graphical schematic construction.

Optionally, or additionally, S210 may function to construct a subscriber-specific context reference data structure based on subscriber-context data. In a preferred embodiment, the subscriber-specific context reference data structure may include distinct entries and/or pieces of data that identify, at least, a target cybersecurity service category, a subscriber-requested customization of a target cybersecurity service, cybersecurity service tuning parameters, and data relating to digital/computing assets actively secured by the target cybersecurity service.

In one or more embodiments, the subscriber-specific context reference data structure may operate to inform selective computations of alert or event handling metrics and/or a generation of one or more contextual intelligence graphical schematics for one or more target subscribers, as described in more detail below.

2.20 Computing Alert Handling Metrics|Deriving Contextual Intelligence

S220, which includes computing cybersecurity alert or event handling metrics, may function to compute one or more alert handling metrics based on collected pieces of data included in a subscriber-specific alert/event data corpus provided by S210. In a preferred embodiment, S220 may function to compute a plurality of alert handling metrics that may provide contextual intelligence to a target subscriber relating to one or more alert processing capabilities of the system 100 and/or may provide context to a target subscriber around a responsiveness of the target subscriber to act on one or more types of system-generated tasks including, but not limited, to identifying cybersecurity threats and generating cybersecurity threat mitigation responses.

It shall be noted that for each alert handling metric computed based on a subscriber-specific alert/event data corpus provided by S210, S220 may optionally function to compute an equivalent cohort alert handling metric based on a cohort-specific alert/event data corpus provided by S210.

(a) System Alert Handling Metrics

In one or more embodiments, a system (e.g., the system 100) or service implementing the method 200 may function to compute a plurality of alert handling metrics that may provide a target subscriber quantitative context relating to alert processing capabilities of the system 100 and a mitigation of cybersecurity events and/or alerts over time. As will be further described in S240, one or more of the alert handling metrics computed by the system 100 and/or the method 200 may be converted into contextual intelligence graphical schematics displayed or presented to a target subscriber via a cybersecurity intelligence interface of a cybersecurity threat configuration and management console.

(i) Alert Response Time Metrics

In one or more embodiments, S220 may function to automatically compute an alert response time metric for a plurality of alert severity levels. It shall be noted that an alert response time, as generally referred to herein, may relate to a measurement of a time elapsed from a target alert arrival or identification in a security threat mitigation user interface (e.g., workbench or a cybersecurity module of the system 100) to the time the target alert may be processed (or identified) by at least some portion of the system 100.

In one or more embodiments, S220 may function to compute an alert response time metric for each of a plurality of distinct alert severity levels based on pieces of data included in the subscriber-specific alert/event data corpus provided by S210. For instance, S220 may function to compute a statistical representation (e.g., a mean, a median, etc.) of the elapsed time from an alert arrival in the security threat mitigation user interface (e.g., workbench) to the time it takes for alert processing by at least some portion of the system 100 for all alerts of a first alert severity level (e.g., a critical alert severity level) of the provided subscriber-specific alert/event data corpus.

In another example, S220 may function to compute a statistical representation (e.g., a mean, a median, etc.) of the elapsed time from an alert arrival in the security threat mitigation user interface (e.g., workbench) to the time it takes for alert processing by at least some portion of the system 100 for all alerts of a second alert severity level (e.g., high severity level) associated with the provided subscriber-specific alert/event data corpus. It shall be noted that S220 may function to compute a statistical representation of an alert response time for any type of alert severity level (e.g., critical, high, medium, low, tuning, etc.).

(ii) Investigations with a Verify Action Metric

In one or more embodiments, S220 may function to automatically compute an investigations with a verify action metric. An investigation with a verify action, as generally referred to herein, may be an investigation that resulted in an initiation of a verify action task that may have requested or asked a subscriber to verify whether activity associated with the subscriber is valid or not during an investigation, as described in U.S. Patent Application No. 63/159,895, filed on 11 Mar. 2021, tiled SYSTEMS AND METHODS FOR INTELLIGENT CYBERSECURITY THREAT DETECTING AND INTELLIGENT VERIFICATION MESSAGES THROUGH AUTOMATED WORKFLOWS, which is incorporated in its entirety by this reference.

Accordingly, S220 may function to compute an investigations with a verify action metric for a target subscriber based on pieces of investigation data included in the subscriber-specific alert/event data corpus. The computed investigations with a verify action metric may be a numerical value (e.g., a percentage) that may characterize a subset of investigations included in the subscriber-specific alert/event data corpus that resulted in a verify action out of all investigations included in the subscriber-specific alert/event data corpus.

It shall be noted that an investigations with a verify action metric below a target threshold may be an indication to a target subscriber that the system 100 implementing the method 200 may be able to conduct investigations and determine outcomes without a need to frequently seek subscriber input.

(iii) System-Validated Security Alerts with Context Metric

In one or more embodiments, S220 may function to automatically compute a system-validated security alert with context metric. A system-validated security alert with context, as generally referred to herein, may preferably relates to a generated or published security alert from a security alert engine that may include one or more context tags that includes characteristics or details about the environment and/or the digital assets of a target subscriber.

Accordingly, S220 may function to compute a system-validated security alert with context metric for a target subscriber based on pieces of alert data included in the subscriber-specific alert/event data corpus. The computed system-validated security alert with context metric may be a numerical representation (e.g., a percentage) of a subset of system-validated security alerts included in the subscriber-specific alert/event data corpus associated with a context tag out of all the system-validated security alerts included in the subscriber-specific alert/event data corpus.

It shall be noted that a high percentage of system-validated security alerts with context may be an indication to a target subscriber that a service implementing the system 100 may be able to efficiently conduct investigations without a large commitment of resources from a target subscriber.

(iv) System-Validated Security Alerts with an Automated Investigation Action Metric In one or more embodiments, S220 may function to automatically compute a system-validated security alert with an automated investigation action metric. A system-validated security alert with an automated investigation action, as generally referred to herein, may preferably relate to a generated or published security alert from a security alert engine that may include additional pieces of information that may have been absent from the original piece of raw alert/event data associated with the system-validated security alert. In one or more embodiments, additional pieces of information may be included in a system-validated security alert based on executing an automated investigation workflow of an automated investigations engine that may function to surface additional alert data then what may have been originally available in the raw alert/event associated with the system-validated security alert.

Accordingly, S220 may function to compute a system-validated security alert with an automated investigation action metric for a target subscriber based on pieces of alert data included in the subscriber-specific alert/event data corpus. The computed metric may be a numerical representation (e.g., a percentage) of a subset of system-validated security alerts of the subscriber-specific alert/event data corpus that historically included a determination and/or performance of an automated investigation action relative to other system-validated security alerts of the subscriber-specific alert/event data corpus.

It shall be noted that a high percentage (e.g., exceeding a threshold value) of system-validated security alerts with an automated investigation action may be an indication that the system 100 may be providing analysts additional information during triaging that surpasses raw alert/event data.

(v) Alert-to-Fix without Verify Action Metric

In one or more embodiments, S220 may function to compute an alert-to-fix metric without a verify action metric. An alert-to-fix without a verify action, as generally referred to herein, may be a measurement of time elapsed from a moment when a target alert (that is not associated with a verify action during an investigation) may be escalated to an incident level to when one or more remediation actions may be proposed (and/or executed) in response to the escalated target alert. The one or more remediation actions when, executed, may function to mitigation a cybersecurity threat of the target alert/event.

Accordingly, S220 may function to compute an alert-to-fix without a verify action metric based on pieces of data included in the subscriber-specific alert/event data corpus. The computed alert-to-fix without a verify action metric may be a single statistical value (e.g., a mean, a median, etc.) that may be a representation of an elapsed time between escalations of alerts to an incident level (absent of a verify action request) to when the escalated alerts may be associated with a remediation action for all alerts included in the subscriber-specific alert/event data corpus.

(b) Subscriber Alert Handling Metrics

As briefly described above, a system (e.g., the system 100) or service implementing the method 200 may function to compute one or more subscriber alert and/or event handling metrics that may provide cybersecurity context intelligence relating to an efficacy in responsiveness of the target subscriber to service- or system-generated subscriber tasks for mitigating a threat or the like associated with one or more cybersecurity-related events and alerts. As will be further described in S240, the subscriber alert handling metrics may be automatically computed by the system 100 and/or the method 200 and may be intelligently displayed and/or presented to a target subscriber via a cybersecurity intelligence interface of a cybersecurity threat configuration and management console.

(i) Subscriber Responsiveness-to-Verify Action Metric

In one or more embodiments, S220 may function to compute a subscriber verify action response metric (e.g., time for you to verify metric). A subscriber verify action response metric (e.g., time for you to verify metric), as generally referred to herein, may be a statistical value that represents an aggregation of elapsed time preferably beginning when verify actions may be assigned to the subscriber to a time when each corresponding verify action may be completed by the subscriber based on the alert data and corresponding investigation data associated with a verify action request included in the subscriber-specific alert/event data corpus.

For example, in one embodiment, the system 100 and/or the method 200 may compute that it may typically take approximately one (1) hour and forty-five (45) minutes for a target subscriber to respond or complete an assigned verify action challenge, confirmation, or the like initiated by a service implementing the system 100.

(ii) Subscriber Responsiveness-to-Remediation Action Metric

In one or more embodiments, S220 may function to compute a subscriber responsiveness-to-remediation action metric (e.g., time for you to remediate metric). A subscriber responsiveness-to-remediation action, as generally referred to herein, may be a measurement of a time elapsed from when a target remediation action may be created and assigned to the subscriber by the system 100 to the time the target remediation action may be completed.

Accordingly, S220 may function to compute a subscriber responsiveness-to-remediation action metric that may be based on each of a plurality of pieces of remediation data included in the subscriber-specific alert/event data corpus. The subscriber responsiveness-to-remediation action metric may be a computed statistical value (e.g., a mean, a median, etc.) based on all remediation alert data included in the subscriber-specific alert/event data corpus that may be associated with computing an elapsed time from when a target remediation action was created and assigned to the subscriber by the system 100 to the time when the target remediation action is completed.

For example, in one embodiment, the system 100 and/or the method 200 may compute a subscriber responsiveness-to-remediation action metric indicating that it may typically take approximately thirty-two (32) minutes for one or more subscribing users to implement a remediation action assigned to the subscriber.

(iii) Alert-to-Fix with Verify Action Metric

In one or more embodiments, S220 may function to compute an alert-to-fix with a verify action metric. An alert-to-fix with a verify action, as generally referred to herein, may be a measurement of time elapsed between a time when a target alert may be escalated (in cybersecurity threat level) to an incident level to when one or more remediation actions may be proposed in response to the target alert associated with a verify action request during a cybersecurity investigation.

Accordingly, S220 may function to compute an alert-to-fix with a verify action metric based on a plurality of pieces of data included in the subscriber-specific alert/event data corpus. The computed alert-to-fix with a verify action metric may be a single statistical value (e.g., a mean, a median, a confidence level, etc.) or a statistical range based on all alert data included in the subscriber-specific alert/event data corpus of a target subscriber that may have been used during computing an elapsed time between the time it may have taken to escalate a target alert to an incident level (with a verify action request) to when the escalated alert was associated with at least one remediation action.

2.30 Generating One or More Graphical Schematics and/or One or More Textual Schematics S230, which includes generating one or more contextual intelligence graphical schematics and/or one or more textual schematics, may function to system-generate one or more graphical schematics and/or one or more textual schematics that may be electronically accessible and/or displayed via a cybersecurity intelligence interface to a target subscriber based on one or more cybersecurity alert or event handling metrics (described herein). In one or more embodiments, S230 may function to system-generate one or more graphical schematics and/or one or more textual schematics based on alert/event data of a subscriber-specific alert/event data corpus provided by S210. In various embodiments, the one or more contextual intelligence graphical schematics may be generated and/or designed in a plurality of distinct forms configurations or formats, which may be informed by or derived according to a computed cybersecurity metric (computed in S220), for depicting an efficacy in handling and/or mitigating cybersecurity threats or events via the cybersecurity system or service (e.g., system 100) implementing the method 200.

Alert-Type Heat Map

In one or more embodiments, S230 may function to system-generate an alert-type heat map based on pieces of alert/event data included in a target subscriber-specific alert/event data corpus provided by S210. An alert-type heat map, as generally referred to herein, may be a graphical schematic that may illustrate a frequency or a magnitude of alert data (e.g., a magnitude of system-validated security alerts) as a varying color gradient with respect to at least two discrete variables (e.g., time of day and the day of the week).

For example, in one or more embodiments, an alert-type heat map may be a clustered heat map that may include a matrix of cells between a row of the alert-type heat map (e.g., a time-of-day row) and a column of the alert-type heat map (e.g., a day of the week column). Each cell of a matrix of cells may be shaded based on an alert color scale to represent a magnitude value (e.g., each cell of the alert-type heap map may graphically illustrate a magnitude of system-validated security alerts as target color intensity based on an alert color scale).

Accordingly, each cell value of a generated alert-type heat map may represent a magnitude of system-validated security alerts (in color based on an alert color scale), which may illustrate to a target subscriber a time of day and a day of the week where system-validated security alerts may be of a high magnitude (exceeding a threshold value) based on the collected pieces of system-validated security alerts of a subscriber-specific alert/event data corpus provided by S210.

Alert Metric Embedded Graphical Schematic

In one or more embodiments, S230 may function to automatically generate one or more graphical schematics and/or graphical user interface windows having one or more alert handling metrics intelligently embedded therein. In a non-limiting example, S230 may function to automatically generate a graphical user interface window based on a cybersecurity event having an elevated and/or a confirmed cybersecurity threat status (e.g., a cybersecurity incident, a cybersecurity attack, or the like). In some embodiments, the graphical user interface window may be referred to herein as an "incident view", which may provide details about a subject cybersecurity threat and/or one or more proposed threat remediation responses. In such non-limiting example, if or when a subscriber access or interfaces with the incident view, S230 may function to compute or access one or more alert handling metrics associated with the subject cybersecurity threat and generate a graphical object into the incident view window that includes the one or more alert handling metrics. In one embodiment, the graphical object comprises an alert-to-fix metric value indicating a measure of time from an identification of a potential cyber threat (e.g., a suspicious event, suspicious login, etc.) to a time of identifying the one or more proposed threat remediation responses.

Additionally, or alternatively, in some embodiments, S230 may function to automatically generate an alert handling timeline identifying a sequence of informative events and associated event details that may be evaluated in a computation of the alert handling metric. In such embodiments, the alert handling timeline may include graphical schematics and event data relating to an initial discovery of a potential cyber threat, an investigative discovery of details of the potential cyber threat, and details relating to a generation of the one or more proposed remediation responses.

Automated Efficacy Synopsis

In one or more embodiments, S230 may function to generate each of the one or more graphical schematics with one or more active or selectable regions that, when selected or other interface action is detected (hovering a cursor, voice command, etc.), S230 may cause an automated generation and presentation via the cybersecurity intelligence interface of a cybersecurity efficacy synopsis that includes an intelligence-based summary of a performance of a cybersecurity service in mitigating one or more cybersecurity threats or events associated with the one or more graphical schematics.

In one or more embodiments, generating an efficacy synopsis based on a selection or an activation of one or more regions of a graphical schematic may include accessing or automatically computing one or more alert handling metrics based on a type of graphical schematic (e.g., alert heat map, incident view, etc.). In a non-limiting example, in response to a selection of one or more cells of an alert-type heat map, S230 may function to generate an efficacy synopsis that explains how an activation of a cybersecurity service or feature, such as alert suppression feature, may have reduced a frequency of non-threat alerts. In this example, S230 may function to access and/or compute one or more alert metrics including a first alert frequency metric in a prior period without the cybersecurity feature and a second alert frequency metric in a subsequent period post activation of the cybersecurity feature. S230 may additionally function to generate textual data by accessing one or more pre-configured templates into which S230 may automatically interleave the computed alert metrics into one or more predetermined locations of the one or more pre-configured templates. Accordingly, in such embodiments, the efficacy synopsis may include a summary explanation of an efficacy of an activation of a cybersecurity feature that may be visually displayed alongside or proximate to the selected region of the graphical schematic.

2.40 Constructing a Cybersecurity Intelligence Interface

S240, which includes constructing a cybersecurity intelligence interface, may function to automatically construct (or system-generate) one or more cybersecurity intelligence interfaces (or interface windows) that may be electronically accessible to a target subscriber of a system or service implementing the method 200. A cybersecurity intelligence interface, as generally referred to herein, may be a subscriber interface that may include one or more cybersecurity alert or event handling metrics and related data provided by S220 and/or one or more system-generated schematics provided by S230 that may be transparently accessible and viewable by a target subscriber. In a preferred embodiment, S240 may function to automatically construct a cybersecurity intelligence interface for one or more subscribers of the system 100 that may include a plurality of alert handling metrics provided by S220 and a plurality of system-generated schematics provided by S230.

In operation, S240 may function to construct a cybersecurity intelligence interface, in parallel (or subsequent or simultaneous) to computing at least one alert handling metric and/or at least one system-generated artifact as described above. In other words, S240 may function to construct (or generate) a cybersecurity intelligence interface in a variety of generation schemes and each of which will be described in more detail below.

System-Default Cybersecurity Intelligence Interface

Figure 4:
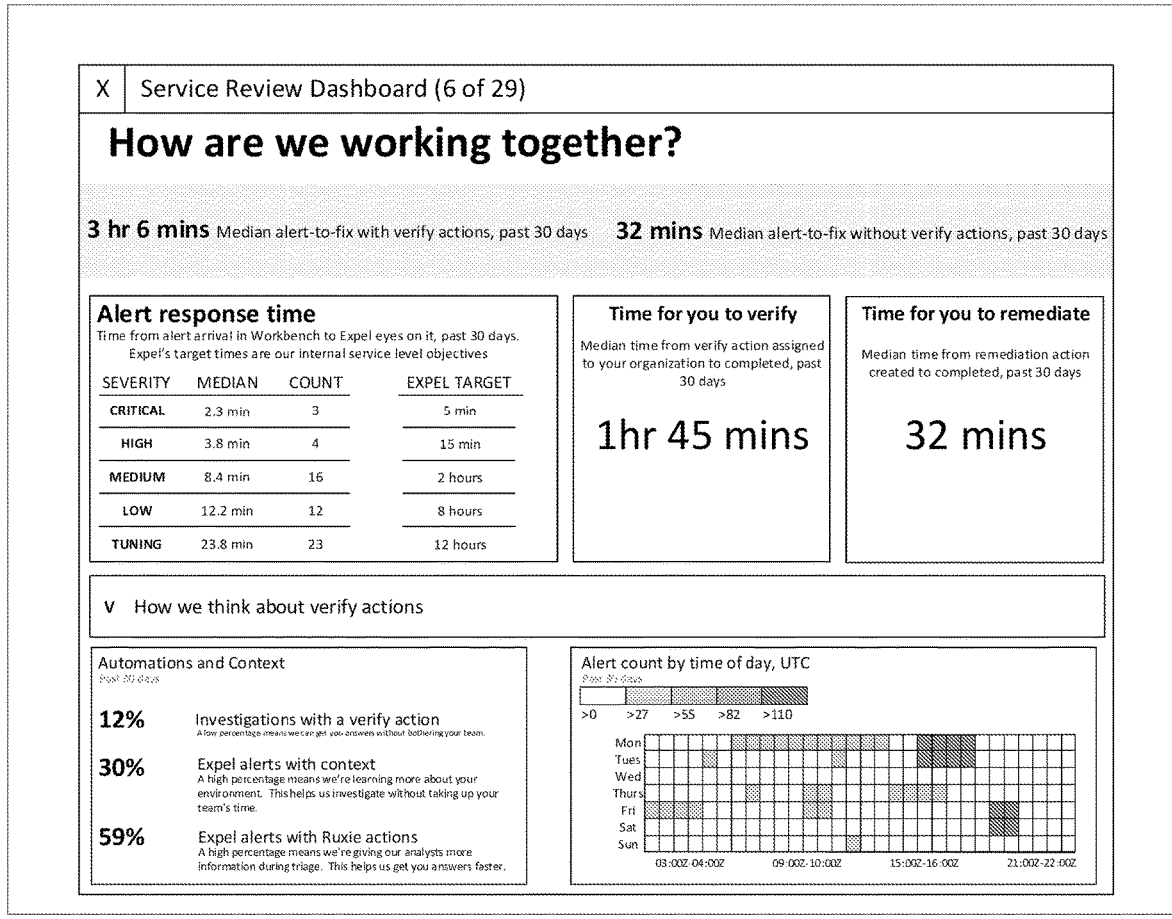
FIG. 4 illustrates an example representation of a service review interface for a target subscriber in accordance with one or more embodiments of the present application.

In a first implementation, constructing (or generating) a cybersecurity intelligence interface may include constructing or generating a system-default service review interface for each of a plurality of subscribers to a service or system (e.g., the system 100) implementing the method 200. In such implementation, the system-default service review interface may be configured to visually display a plurality of alert handling metrics and one or more system-generated schematics in a standardized arrangement across the entire subscriber base or a majority of the subscriber base of the system 100, as shown generally by way of example in FIG. 4.

It shall be noted that even though in some embodiments the layout or the positioning of the plurality of alert handling metrics and the one or more system-generated schematics of the system-default service review may be standardized across each of the plurality of subscribers, each of the alert handling metrics and the one or more system-generated schematics may be computed on a per-subscriber basis. That is, an arrangement of the one or more graphical schematics and/or one or more alert handling metrics may be customized according to preferences or the like of a target subscriber. In such embodiments, a construction and/or an arrangement of the one or more alert handling metrics and the one or more system-generated schematics may be informed by a subscriber-specific context reference data structure for a target subscriber.

In one embodiment, a standardized layout or positioning of a plurality of alert handling metrics and one or more system-generated schematics of the system-default service review interface may be arranged in such a way to effectively communicate the plurality of alert handling metrics and the one or more system-generated schematics in an interpretable and/or digestible format to a target subscriber. The plurality of alert handling metrics and the one or more system-generated schematics of the system-default service review interface may be intelligently arranged on the system-default service review interface in a top-to-bottom direction and/or a left-to-right direction relative to a viewpoint of a target subscriber.

In a non-limiting example, at a top portion of the system-default service review interface, an alert-to-fix with verify actions metric may be positioned adjacent to an alert-to-fix without verify action in a common alert banner that may extend in a left-to-right direction. The common alert banner that may extend in a left-to-right direction and may include a first time value (e.g., 3 hr and 6 mins) and a first text representation (e.g., median alert-to-fix with verify actions, past 30 days) that may explain the time value of the alert-to-fix with verify actions metric and a second time value (e.g., 32 mins) and a second text representation (e.g., median alert-to-fix without verify actions, past 30 days) that may explain the time value of the alert-to-fix without verify actions metric. It shall be noted that each of the time values and the text representations of both the alert-to-fix with verify actions metric and the alert-to-fix without verify actions metric may be generally displayed in a longitudinal direction.

Additionally, in such example of the system-default service review interface, an alert response time tile may be positioned (e.g., directly) below and in line with the alert-to-fix with verify action metric. In such example, the alert response time tile may include an alert response time for each of a plurality of alert severity categories and adjacent and to the right of each alert response time associated with an alert severity category may optionally be a target system response objective displayed for each corresponding alert severity category.

Additionally, in such example of the system-default service review interface, a time for subscriber to verify tile may be positioned adjacent to and to the right of the alert response time tile. The time for you to verify tile may include a subscriber responsiveness-to-verify action metric that may include a text explanation of the time for you to verify tile (e.g., median time from verify action assigned to your organization to completed, past 30 days) and a time value (e.g., 1 hr and 45 mins) associated with the text explanation of the time for you to verify tile.

Additionally, in such example of the system-default service review interface, a time for you to remediate tile may be positioned adjacent and to the right of the time for you to verify tile. The time for you to remediate tile may include a subscriber responsiveness-to-remediation metric that may include a text explanation of the time for you to remediate tile (e.g., median time from remediation action created to completed, past 30 days) and a time value (e.g., 32 mins) associated with the text explanation of the time for you to remediate tile.

Additionally, in such example of the system-default service review interface, an automations and context tile may be positioned below and adjacent to the alert response time tile. The automations and context tile may include a plurality of alert metrics including an investigation with a verify action metric, a system-validated security alert with context metric, and a system-validated security alert with security alert engine metrics. In some embodiments of the automations and context tile, a top portion of the automations and context tile may include an investigation with a verify action metric that may include a numerical percentage (e.g., 12%) and a text explanation (e.g., a low percentage means we can get answers without bothering your team) associated with the investigation with verify action metric.

Further, in some embodiments of the automations and context tile, a system-validated security with context metric may be positioned below and in line with the investigation with a verify action metric and may include a numerical percentage (e.g., 30%) and a text explanation (e.g., a high percentage means we are learning more about your environment. This helps us investigate without taking up your team's time) associated with the system-validated security alert with context metric).

Furthermore, in some embodiments of such example, a system-validated security alert with investigations engine may be positioned below and adjacent to the system-validated security alert with context metric and may include a numerical percentage (e.g., 59%) and a text explanation (e.g., a high percentage means we're giving our analysts more information during triage. This helps us get you answers faster) of the system-validated security alert with investigations engine.

Additionally, in such example of the system-default service review interface, an alert count by time-of-day tile may be positioned adjacent and to the right of the automations and context tile. The alert count by time-of-day tile may include an alert-type heat map as described above and each of the plurality of cells of the alert-type heat map may be selectable by a subscriber to display all corresponding system-validated security alerts associated with the selected cell of the alert-type heat map.

It shall be recognized that while the above-described examples and/or embodiments of the present application describe specific arrangements of graphical components, such as the graphical schematics and the alert handling metrics, within the cybersecurity intelligence interface, other arrangements of the graphical components may be contemplated and/or achieved based on the disclosure provided herein and including based on subscriber-specific context reference data structures.

Subscriber-Specific Service Review Interface

In a second implementation, S220 may include constructing or generating a personalized (or customized) service review interface for each subscriber of a plurality subscribers to the service or system implementing the method 200. In such implementation, the subscriber-personalized service review interface may be dynamically configured to display one or more system-generated schematics and one or more alert handling metrics based on satisfying an alert handling display criteria for each of the one or more alert handling metrics.

In one or more embodiments, each alert handling display criteria for each target alert handling metric may include a metric in-range criterion and/or a metric out-of-range criterion and based on a target computed metric having a value within the metric out-of-range criterion the target alert handling metric may be displayed on a subscriber-personalized service review interface. In other words, if and when a target computed alert handling metric may be identified or determined to be outside of a system-expected range or a system-defined range, the target computed alert handling metric may be displayed on the subscriber-personalized service review interface. Alternatively, if and when a target computed alert handling metric may be identified or determined to be within a system-expected range or a system-defined range, the target computed alert handling metric may not be displayed on the subscriber-personalized service review interface.

In other words, in one or more embodiments of a subscriber-personalized service review interface, a subset of alert handling metrics computed by S220 may be displayed on a subscriber-personalized service review interface and a subset of the computed alert handling metrics by S220 may be hidden (e.g., not displayed) on a subscriber-personalized service review interface. For example, a first subscriber-personalized service review interface for a first target subscriber may have a first plurality of alert handling metrics that may satisfy a plurality of alert handling display criterion and a second subscriber-personalized service review interface for a target subscriber may have a second plurality of alert handling metrics that may satisfy a plurality of alert handling display criterion distinct from the first plurality of alert handling metrics of the first subscriber-personalized service review interface.

At least one technical advantage of S240 computing a subscriber-personalized service review interface for each of a plurality of subscribers may provide an ability for each subscriber to focus on non-optimal alert handling areas rather than on optimal alert handling areas to improve on a current performance of a system (e.g., the system 100 implementing the method 200).

Figure 5:
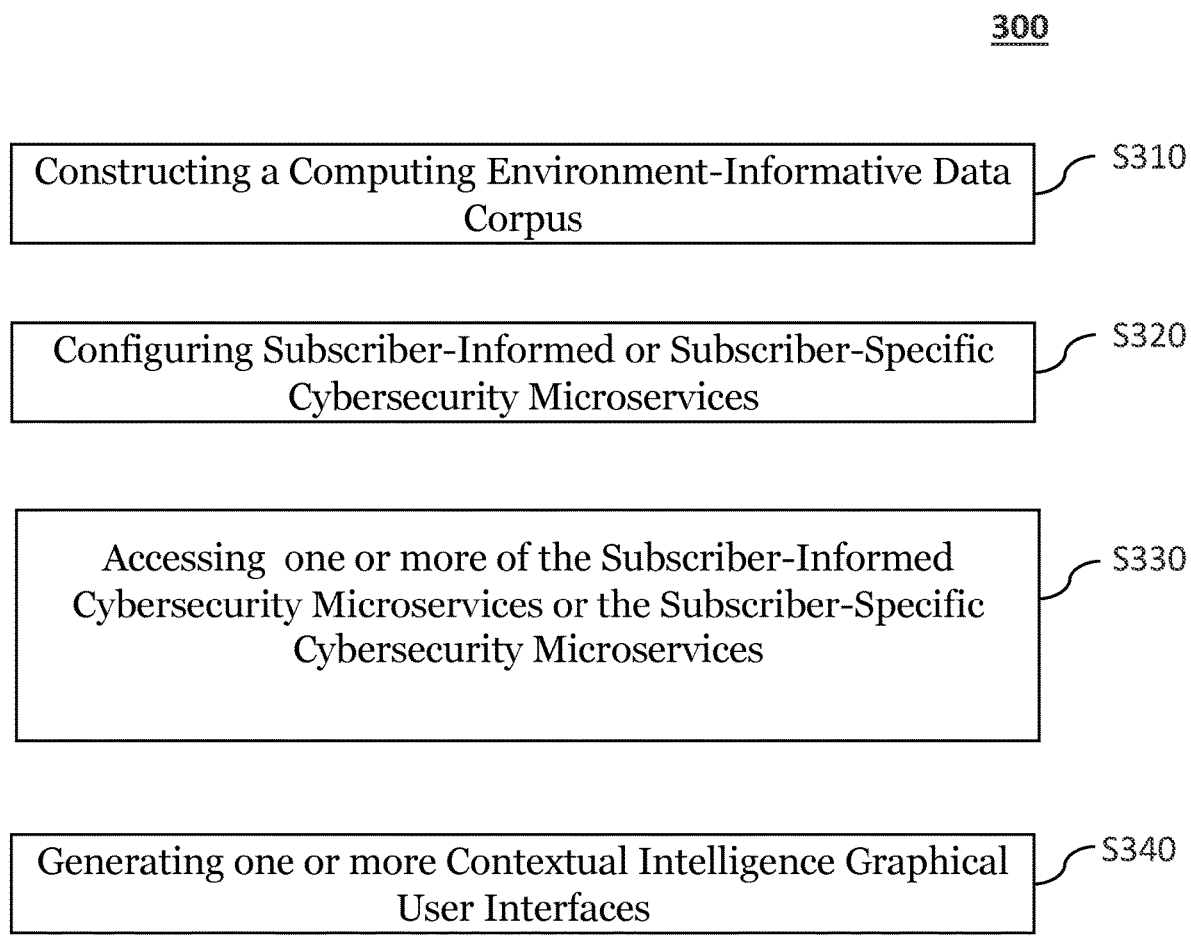
FIG. 5 illustrates an example method 300 in accordance with one or more embodiments of the present application.

3.0 A Method for Intelligently Obtaining and Deploying Cybersecurity Contextual Intelligence Data in one or more Cybersecurity Microservices of a Cybersecurity Event Detection and Response Service As shown in FIG. 5, a method 300 for intelligently obtaining and deploying cybersecurity contextual intelligence data in one more cybersecurity microservices of a cybersecurity event detection and response service may include constructing a computing environment-informative data corpus S310, configuring subscriber-specific cybersecurity microservices based on the computing environment-informative data corpus S320, accessing one or more subscriber-informed cybersecurity microservices S330, and generating one or more contextual intelligence graphical user interfaces S340.

3.10 Constructing a Computing Environment-Informative Data Corpus

Figure 10:
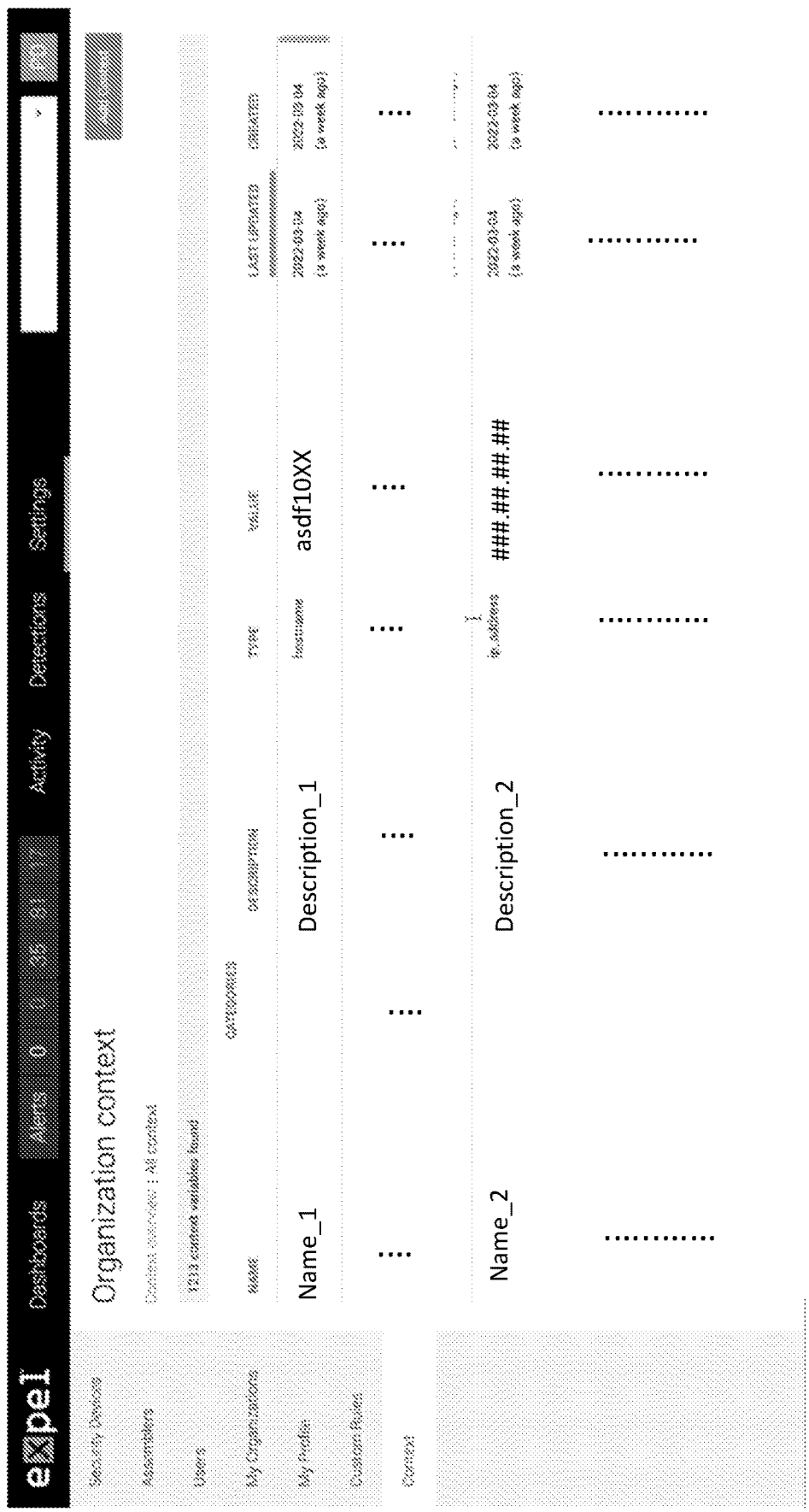

S310, which includes constructing a computing environment-informative data corpus, may function to construct or generate a computing environment-informative data corpus for one or more subscribers subscribing to a system or service (e.g., the system or service 100) implementing the method 300. A computing environment-informative data corpus, as generally referred to herein, may include a plurality of distinct pieces of computing environment-informative data associated with one or more computing environments of a target subscriber, as shown generally by way of example in FIGS. 10 and 11. It shall be recognized that the phrase "computing environment-informative data corpus" may be interchangeably referred to herein as a "subscriber-specific data corpus", "a subscriber-specific computing environment data corpus", a "subscriber context corpus", "a subscriber-specific contextual intelligence data corpus", or the like.

In one or more embodiments, S310 may function to construct or generate a computing environment-informative data corpus for a target subscriber during a subscriber enrollment or subscriber onboarding (of the target subscriber) to the cybersecurity event detection and response service. For instance, in a non-limiting example, the cybersecurity event detection and response service may have n-number of distinct subscribers and S310 may function to construct or generate n-number of distinct computing environment-informative data corpora based on the n-number of subscribers. As will be described in more detail herein, constructing or generating a computing environment-informative data corpus may function to enable an intelligent adaptation or transformation of one or more cybersecurity microservices of a cybersecurity service (implementing the method 300) based on subscriber-informed or subscriber-provided context data (e.g., subscriber-provided contextual intelligence data).

Constructing a Computing Environment-Informative Data Corpus Via a Graphical User Interface (GUI)

Figure 9:
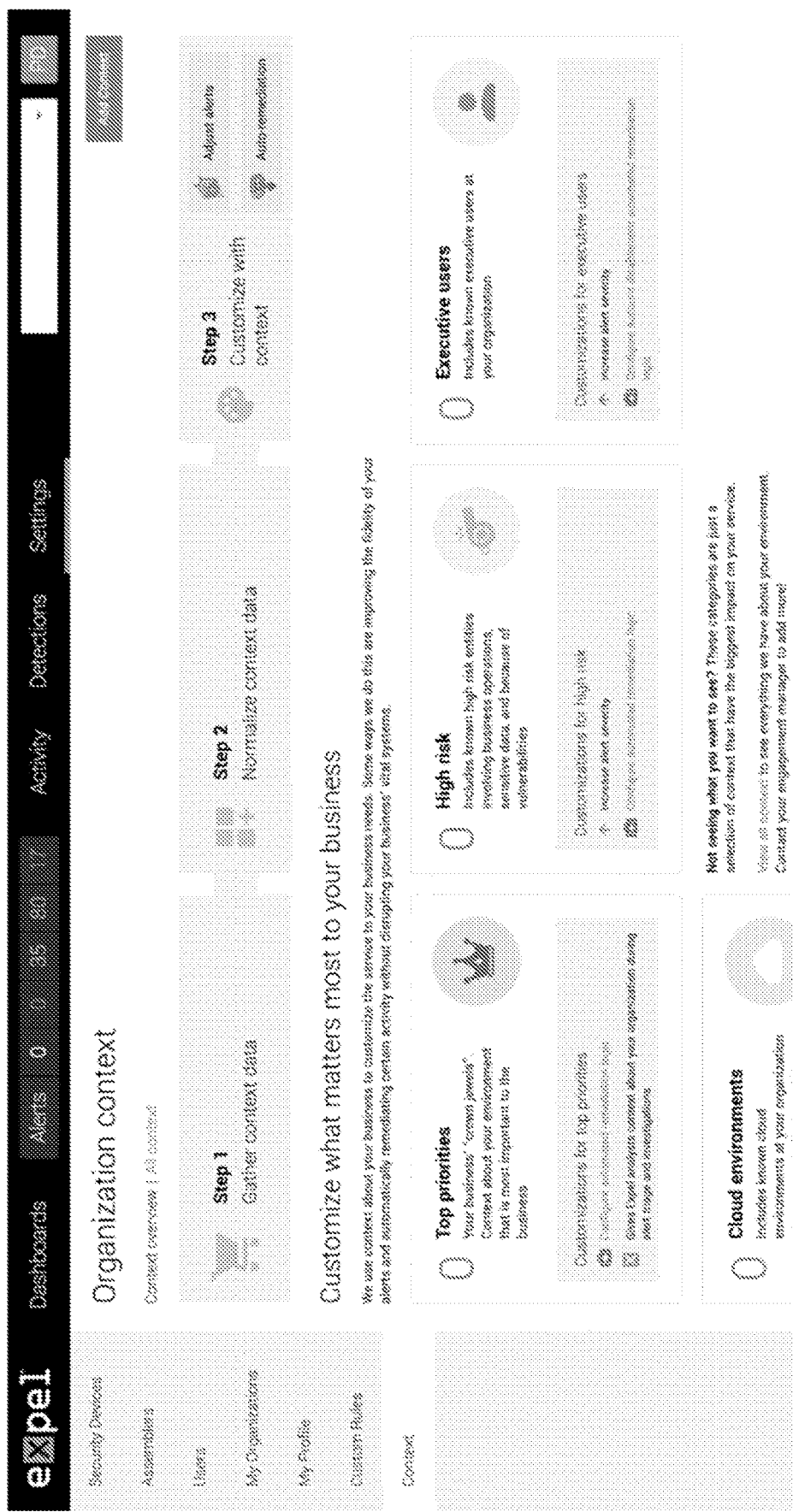

In a first implementation, S310 may function to construct a computing environment-informative data corpus for a target subscriber via one or more graphical user interfaces (e.g., a subscriber-context sourcing graphical user interface or the like), as shown generally by way of example in FIG. 9. In one or more embodiments, an arrangement or layout of the subscriber-context sourcing graphical user interface may include a plurality of distinct regions or portions that may correspond to a plurality of distinct subscriber-context sourcing stages. The distinct regions or portions may collectively enable a subscriber, an analyst, or the like to intuitively provide a system or service implementing the method 300 a plurality of distinct pieces of computing environment-informative data on a per-computing environment informative data sample basis (e.g., individually, one by one, or the like).

Figure 12:
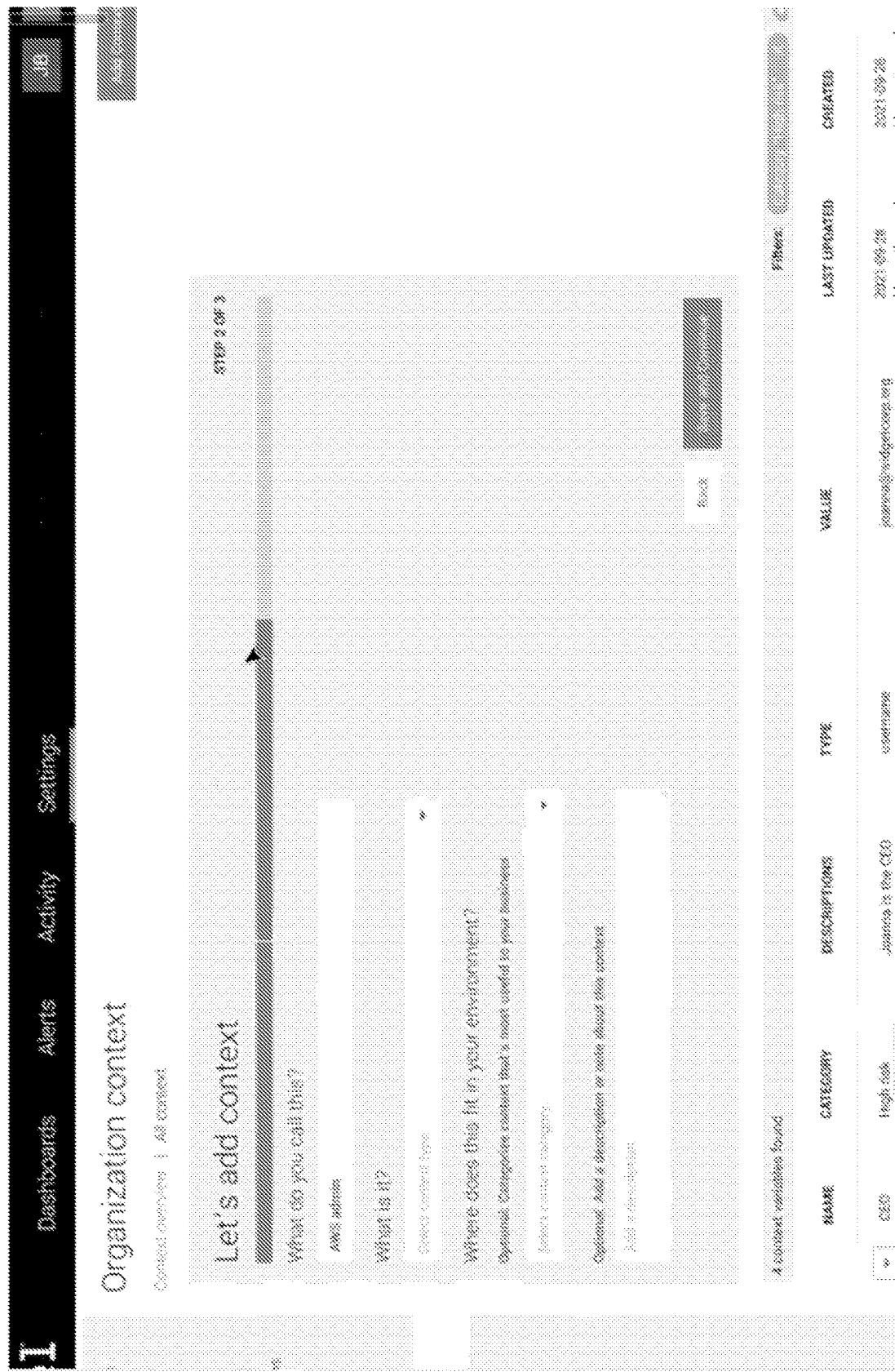
Figure 13:
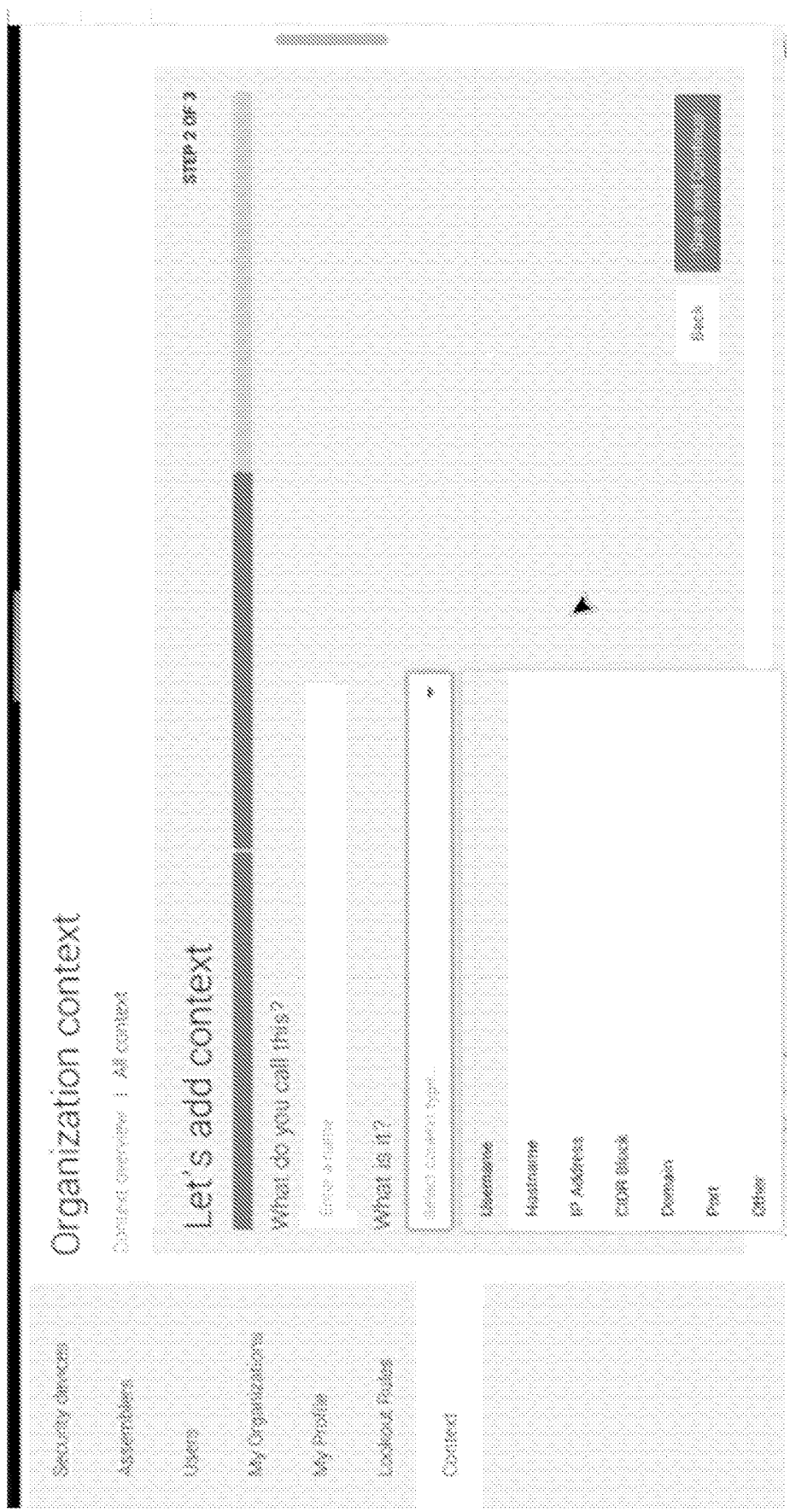
Figure 14:
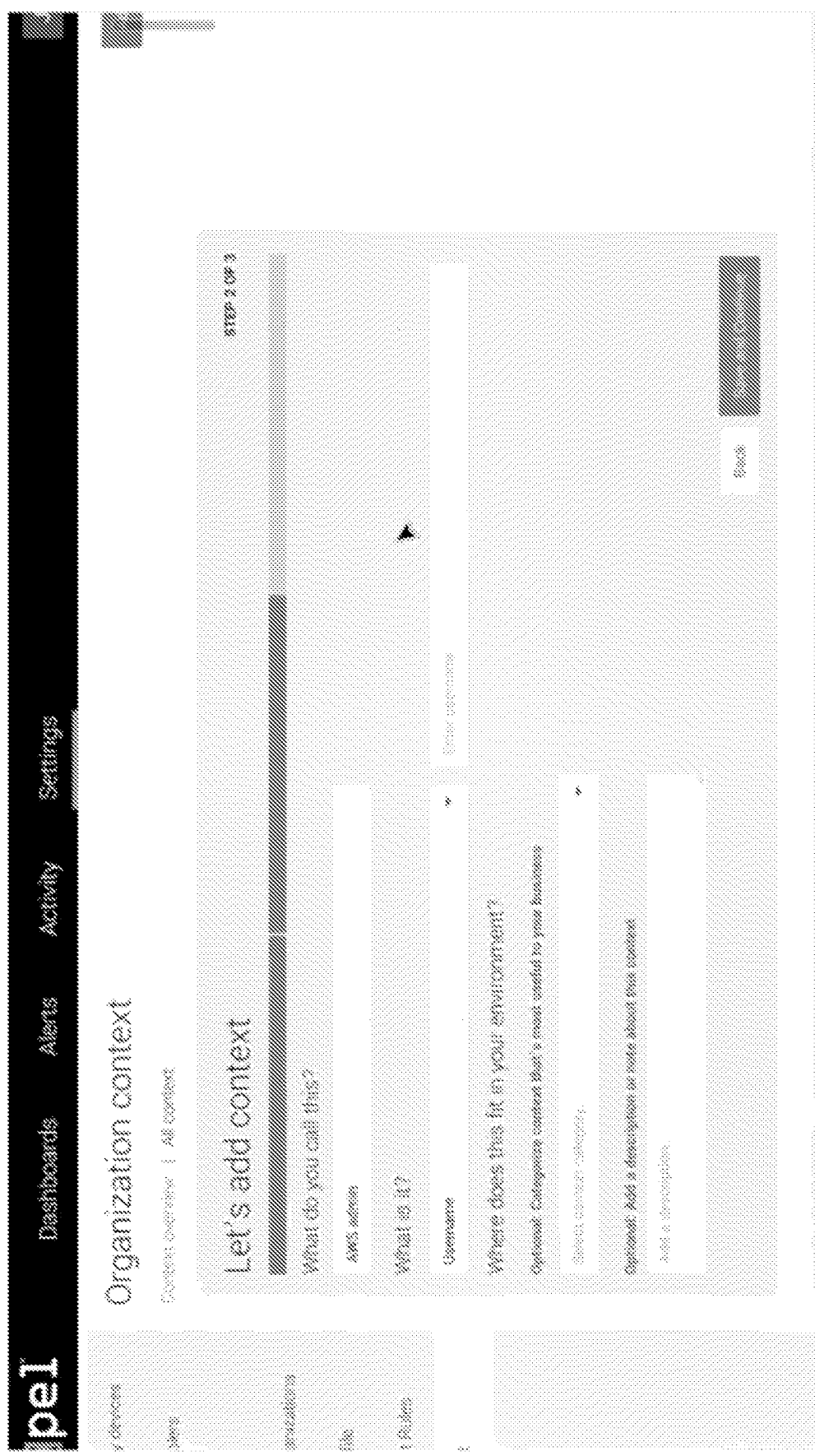
Figure 15:
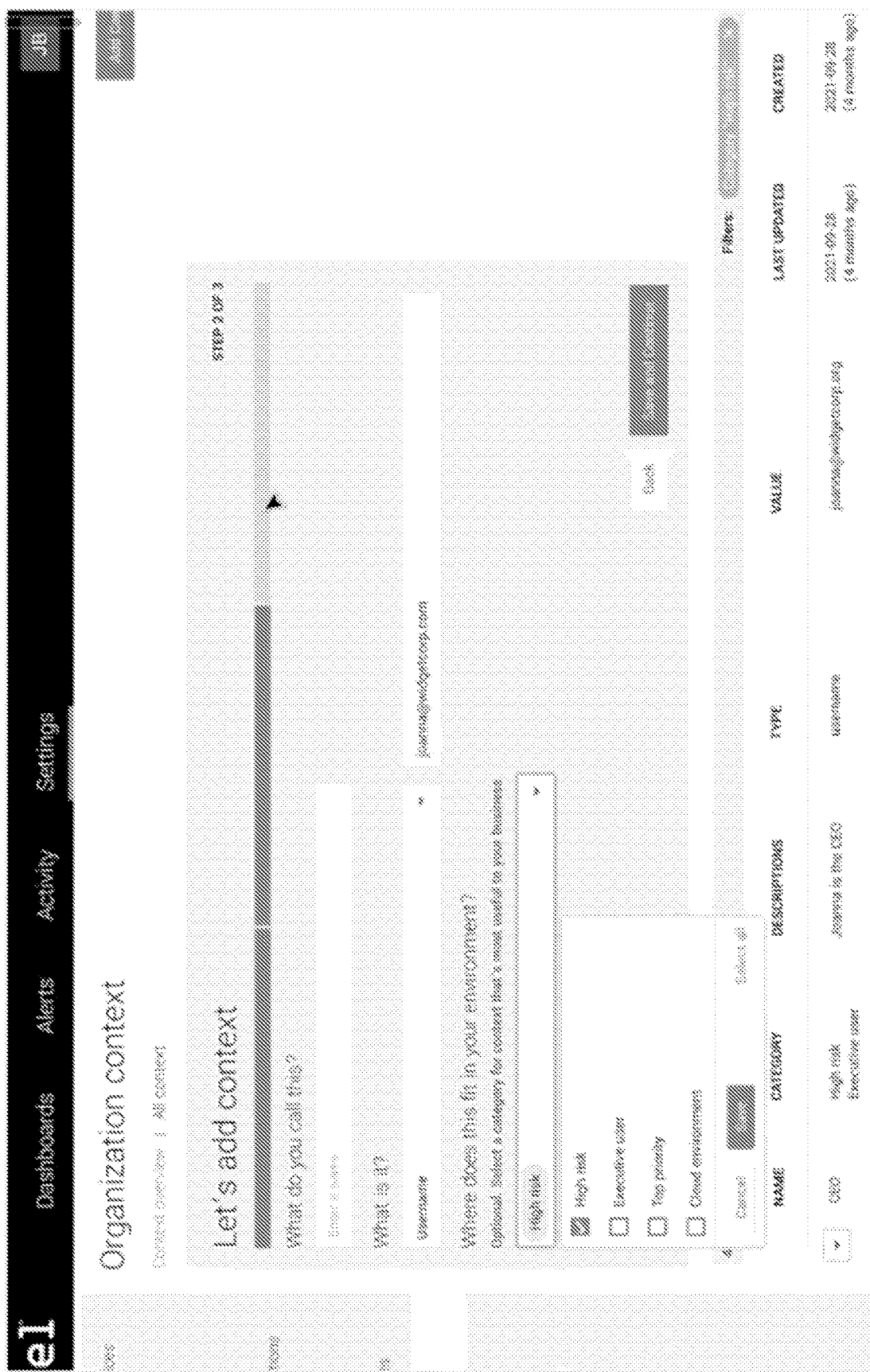
Figure 16:
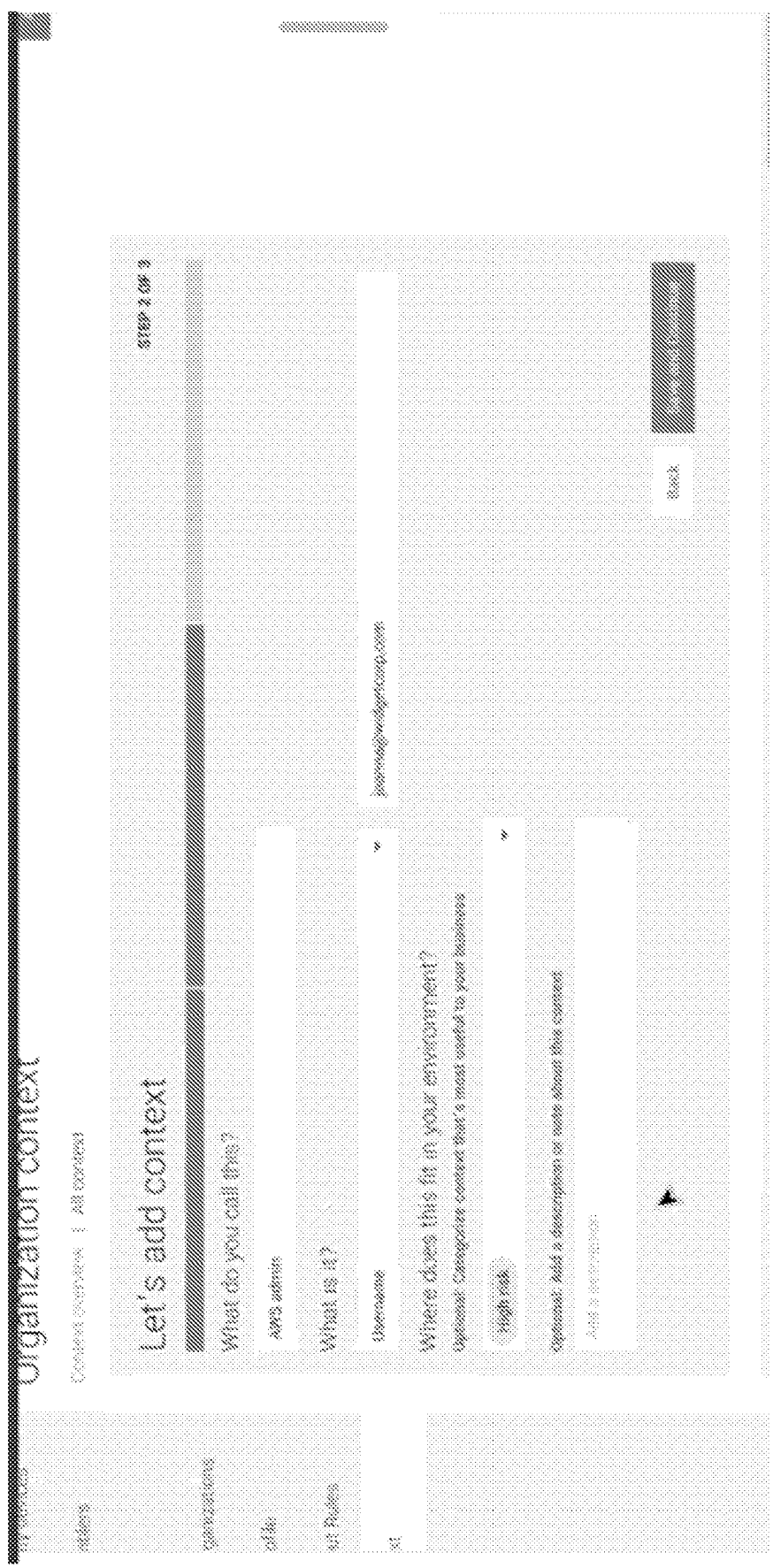

In one or more embodiments of the first implementation, S310 may function to display a subscriber-context sourcing graphical user interface that may include a plurality of distinct data sourcing fields. In such embodiments, the subscriber-context sourcing graphical user interface may include an entity name or entity title data field that may be configured to receive a title or name associated with (or corresponding to) a subject piece of computing environment-informative data, as shown generally by way of example in FIG. 12. Additionally, or alternatively, in such embodiments, the subscriber-context sourcing graphical user interface may include an entity type data field that may be configured to receive a data type associated with (or corresponding to) the subject piece of computing environment-informative data (e.g., username, hostname, internet protocol (IP) address, classless inter-domain routing (CIDR) block, domain, port, other, etc.), as shown generally by way of example in FIG. 13. Additionally, or alternatively, in such embodiments, the subscriber-context sourcing graphical user interface may include an entity data field that may be configured to receive a data value or entity associated with (or corresponding to) the subject piece of computing environment-informative data (e.g., a username, a hostname, an internet protocol (IP) address, a classless inter-domain routing (CIDR) block, a domain, a port, other, etc.), as shown generally by way of example in FIG. 14 and FIG. 15. Additionally, or alternatively, in such embodiments, the subscriber-context sourcing graphical user interface may include a context category data field that may be configured to receive a context-informed category in view of how the subject piece of computing environment-informative data is associated with (or relates to) one or more computing environments of the target subscriber (e.g., high risk, executive user, top priority, cloud environment, etc.), as shown generally by way of example in FIG. 15. Additionally, or alternatively, in such embodiments, the subscriber-context sourcing graphical user interface may include a context description data field that may be configured to receive (or obtain) one or more text strings of subscriber-provided or subscriber-informed description that relates to the subject piece of computing environment-informative data, as shown generally by way of example in FIG. 16.

Figure 17:
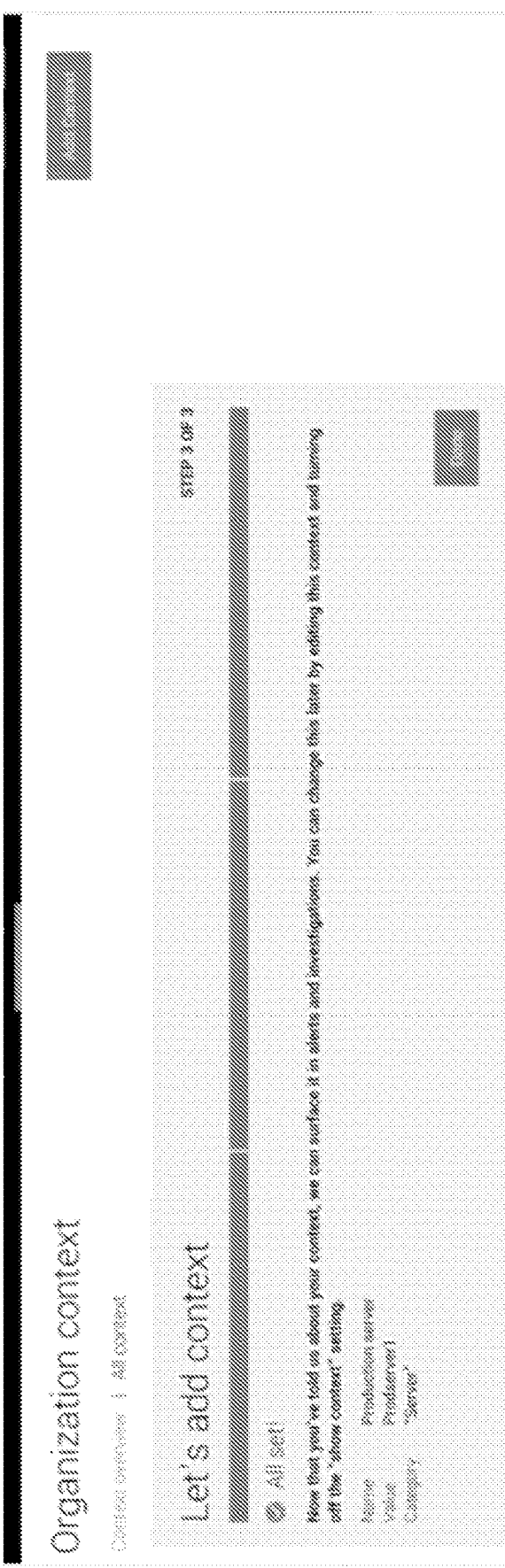

Accordingly, in one or more embodiments, one or more pieces of computing environment-informative data may be added to a target subscriber-specific computing environment-informative data corpus based on a subscriber, an analyst or the like associated with the target subscriber-specific computing environment-informative data corpus using the subscriber-context sourcing graphical user interface, as shown generally by way of example in FIG. 17. Stated another way, via the subscriber-context sourcing graphical user interface, S310 may function to obtain or receive one or more pieces of computing environment-informative data to (e.g., automatically) include in the target subscriber-specific computing environment-informative data corpus.

Figure 11:
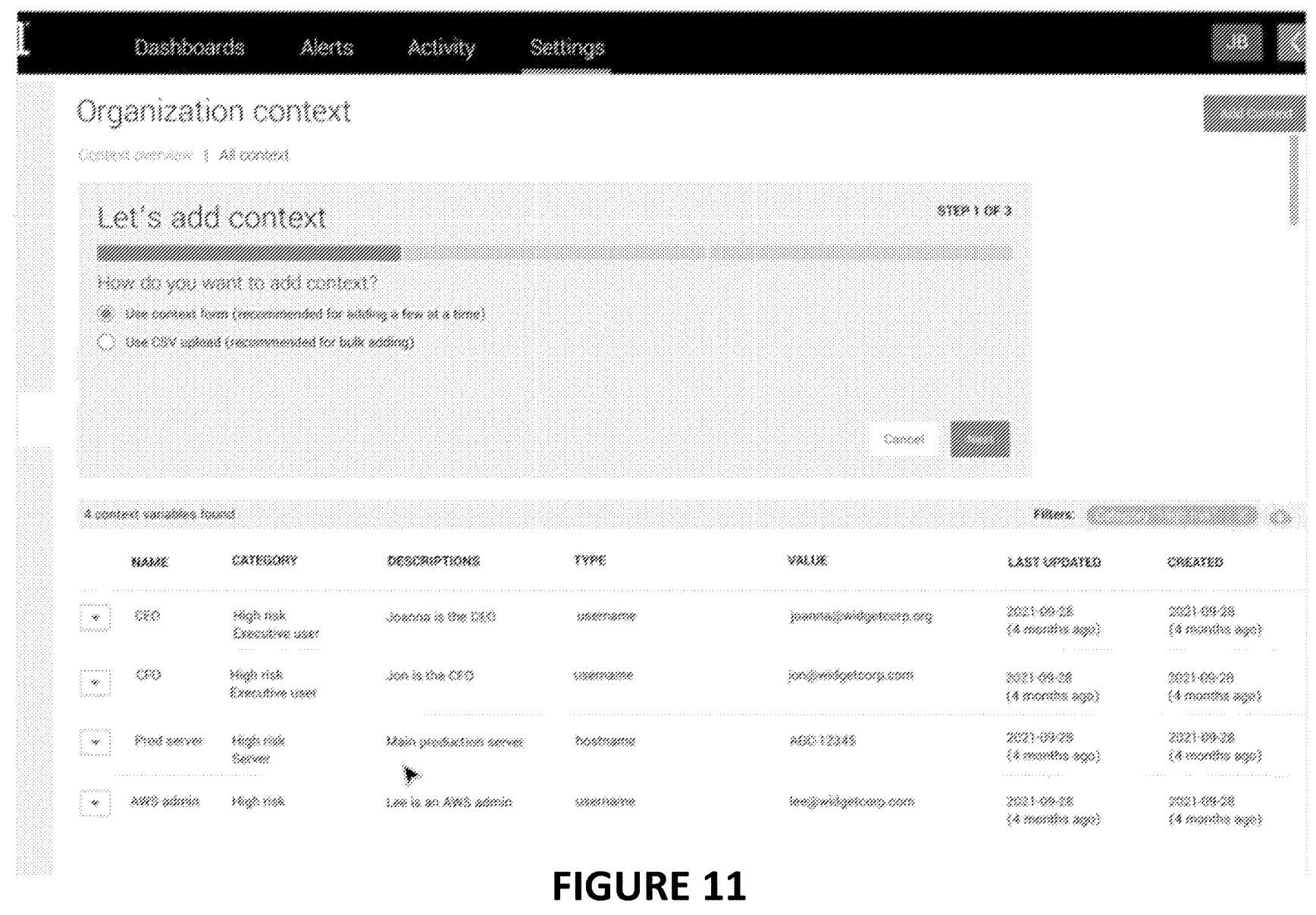

It shall be noted that in some alternative embodiments, the subscriber-context sourcing interface may be configured to allow a subscriber, an analyst or the like to accept, as input, documents or files that may include a collection of computing environment-informative data for uploading the collection of computing environment-informative data in bulk, as shown generally by way of example in FIG. 11.

3.20 Configuring Subscriber-Specific Cybersecurity Microservices

S320, which includes configuring subscriber-specific cybersecurity microservices, may function to configure one or more subscriber-specific cybersecurity microservices for a target subscriber based on a computing environment-informative data corpus associated with the target subscriber. A subscriber-specific cybersecurity microservice, as generally referred to herein, may be a cybersecurity microservice that includes a set of (programmatic) context-informed cybersecurity event handling instructions and/or (programmatic) context-informed cybersecurity alert handling instructions that corresponds to a subscriber preference to how the cybersecurity microservice functions/operates (e.g., responds to cybersecurity events, cybersecurity alerts, or the like). In one or more embodiments, S320 may function to configure and/or implement one or more subscriber-specific cybersecurity microservices for a target subscriber in a variety of modes as described in more detail herein.

It shall be noted that, in one or more embodiments, a plurality of distinct cybersecurity microservices may be in digital communication with the cybersecurity event detection and response service and may collectively operate to detect cybersecurity events/alerts and respond to the cybersecurity events/alerts. For instance, in a non-limiting example, the cybersecurity event detection and response service may include an automated remediations microservice that may function to automatically remediate (or mitigate) cybersecurity events/alerts that include at least one event feature (e.g., username, etc.) that satisfies or matches automated remediation criteria, as described in U.S. Patent Application No. 63/338,832, titled SYSTEMS AND METHOD FOR ACCELERATED REMEDIATIONS OF CYBERSECURITY ALERTS AND CYBERSECURITY EVENTS, which is incorporated in its entirety by this reference.

Additionally, or alternatively, in one or more embodiments, the cybersecurity event detection and response service may include an alert/event suppression microservice that may function to automatically suppress or dispose of cybersecurity events/alerts that include at least one event feature (e.g., username, IP address, etc.) that satisfies or matches event/alert suppression criteria, as described in U.S. Patent Application No. 63/351,784, titled SYSTEMS AND METHODS FOR INTELLIGENT CONFIGURATION AND DEPLOYMENT OF ALERT SUPPRESSION PARAMETERS IN A CYBERSECURITY THREAT DETECTION AND MITIGATION PLATFORM, which is incorporated in its entirety by this reference.

Figure 18:
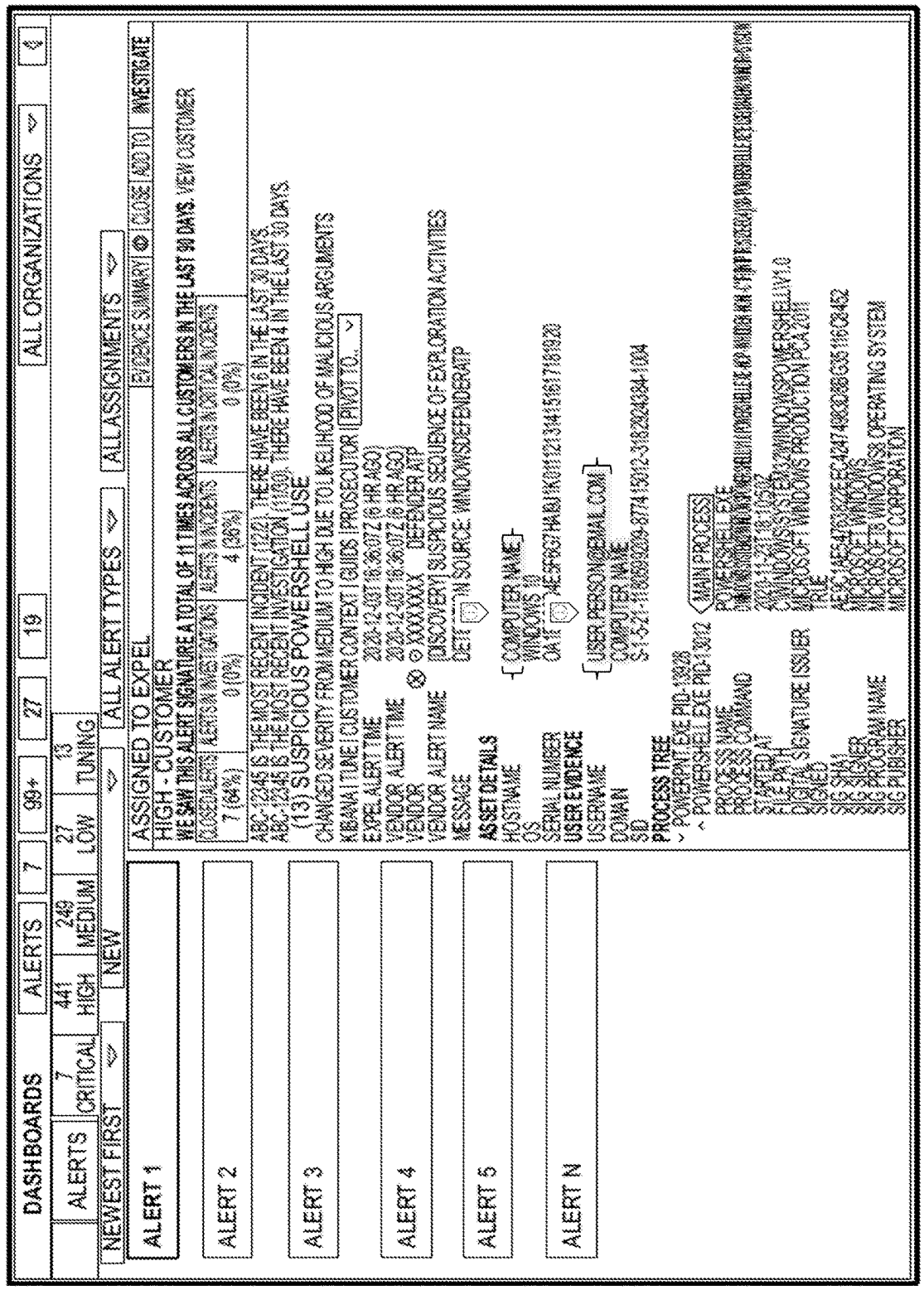
Figure 19:
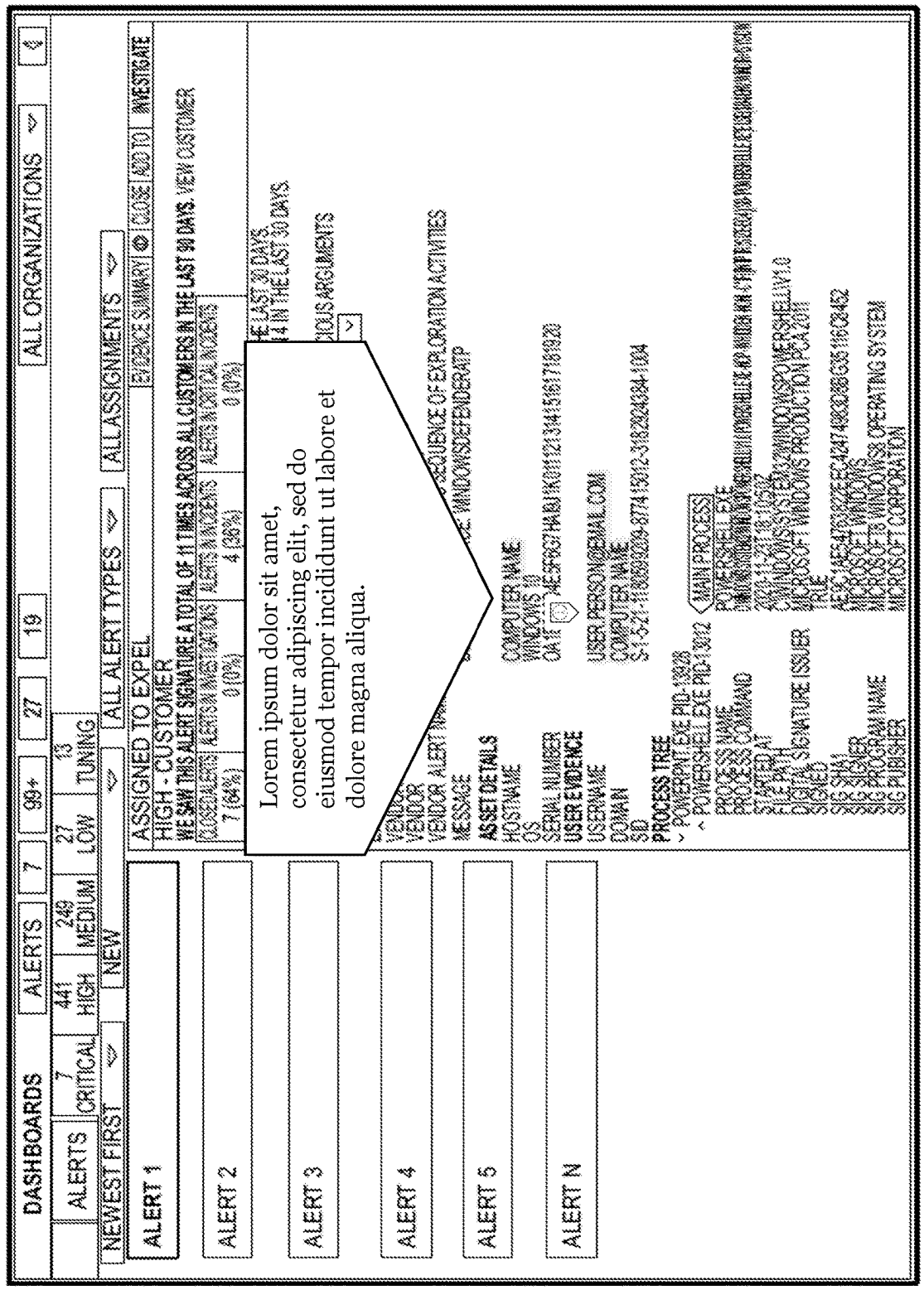

Additionally, or alternatively, in the same non-limiting example, the cybersecurity event detection and response service may include a cybersecurity event/alert annotation microservice that may function to automatically annotate, via a graphical user interface or the like, event data features of cybersecurity events/alerts that include at least one event feature (e.g., username, IP address, etc.) that satisfies or matches event/alert annotation criteria, as shown generally by way of example in FIG. 18 and FIG. 19.

Additionally, or alternatively, in the same non-limiting example, the cybersecurity event detection and response service may automatically increase or decrease a degree of cybersecurity threat associated with each distinct cybersecurity event/alert based on cybersecurity event/alert threat escalation and de-escalation criteria (e.g., programmatic heuristics, cybersecurity instructions, or the like).

Adapting Subscriber-Agnostic Cybersecurity Microservices to Subscriber-Specific Cybersecurity Microservices In one or more embodiments, S320 may function to adapt or transform any one of a plurality of distinct subscriber-agnostic cybersecurity microservices (e.g., the above-mentioned microservices, etc.) to a corresponding subscriber-specific cybersecurity microservice. It shall be noted that in one or more embodiments, each of the plurality of distinct subscriber-agnostic cybersecurity microservices may include a plurality of distinct subscriber-agnostic cybersecurity event handling instructions that may function to protect digital assets (of subscribers) independent of subscriber context data (e.g., the computing environment-informative data corpus constructed in S310).

In one or more embodiments, S320 may function to (e.g., automatically) generate and/or derive, by one or more computers, one or more subscriber-specific cybersecurity event handling instructions (e.g., context-informed cybersecurity event handling instructions) for a target subscriber based on one or more pieces of computing environment-informative data included in the computing environment-informative data corpus associated with the target subscriber.

In one or embodiments, S320 may function to generate and/or derive one or more subscriber-specific cybersecurity event handling instructions based on one or more context-informed categories (e.g., high risk, executive user, top priority, cloud environment, etc.) and/or one or more data types (e.g., username, hostname, internet protocol (IP) address, classless inter-domain routing (CIDR) block, domain, port, other, etc.) associated with one or more pieces of computing environment-informative data included in the computing environment-informative data corpus.

In a non-limiting example, based on identifying a critical cybersecurity entity (e.g., a computing environment-informative piece of data associated with a high-risk attribute, an executive user attribute, a top priority attribute, or the like), S320 may function to generate a subscriber-specific cybersecurity event handling instruction (e.g., a context-informed cybersecurity event handling instruction, a context-informed cybersecurity event handling heuristic, etc.) that may adjust or tune an operation of one or more cybersecurity microservices (of the system or service 100) to accelerate a detection and/or mitigation of cybersecurity events/alerts that relate or involve the critical cybersecurity entity. That is, in one or more embodiments, based on a subset of a plurality of distinct pieces of computing environment-informative data of the subscriber-specific data corpus comprising one or more critical cybersecurity entities of the target subscriber, S320 may function to generate a context-informed cybersecurity event handling instruction or a plurality of distinct context-informed cybersecurity event handling instructions that, when executed, causes an automatic escalation of a threat severity level of a suspect cybersecurity event that involves the one or more critical cybersecurity entities, as shown generally by way of example in FIG. 20.

Additionally, or alternatively, in another non-limiting example, based on identifying a non-critical cybersecurity entity (e.g., a computing environment-informative piece of data associated with a non-critical attribute, a testing attribute, a tuning attribute, or the like), S320 may function to generate a subscriber-specific cybersecurity event handling instruction (e.g., a context-informed cybersecurity event handling instruction, a context-informed cybersecurity event handling heuristic, etc.) that may adjust or tune an operation of one or more cybersecurity microservices (of the system or service 100) to de-prioritize cybersecurity events/alerts that relate to or involve the non-critical cybersecurity entity. That is, in one or more embodiments, based on a subset of a plurality of distinct pieces of computing environment-informative data of the subscriber-specific data corpus comprising one or more non-critical cybersecurity entities (e.g., test servers, low priority digital assets, etc.) of the target subscriber, S320 may function to generate a context-informed cybersecurity event handling instruction or a plurality of distinct context-informed cybersecurity event handling instructions that, when executed, causes an automatic de-escalation of a threat severity level (or an automatic disposal) of a suspect cybersecurity event that involves the one or more non-critical cybersecurity entities.

Additionally, or alternatively, in another non-limiting example, based on a subset of the plurality of distinct pieces of computing environment-informative data of the subscriber-specific data corpus comprising one or more temporary user location adjustments for one or more users associated with the target subscriber (e.g., traveling users), S230 may function to generate an ephemeral context-informed cybersecurity event handling instruction or a plurality of distinct ephemeral context-informed cybersecurity event handling instructions that, when executed, causes an automatic escalation or de-escalation of a threat severity level of a suspect cybersecurity event that involves the one or more temporary location adjustments or traveling users.

Additionally, or alternatively, in another non-limiting example, based on a subset of the plurality of distinct pieces of computing environment-informative data of the subscriber-specific data corpus comprising one or more critical cybersecurity entities of the target subscriber, S320 may function to generate a context-informed cybersecurity event handling instruction or a plurality of distinct context-informed cybersecurity event handling instructions that, when executed, automatically activates an automated remediations microservice of the cybersecurity service to automatically remediate or mitigate a suspect cybersecurity event that involves the one or more critical cybersecurity entities, as shown generally by way of example in FIG. 9.

Figure 20:
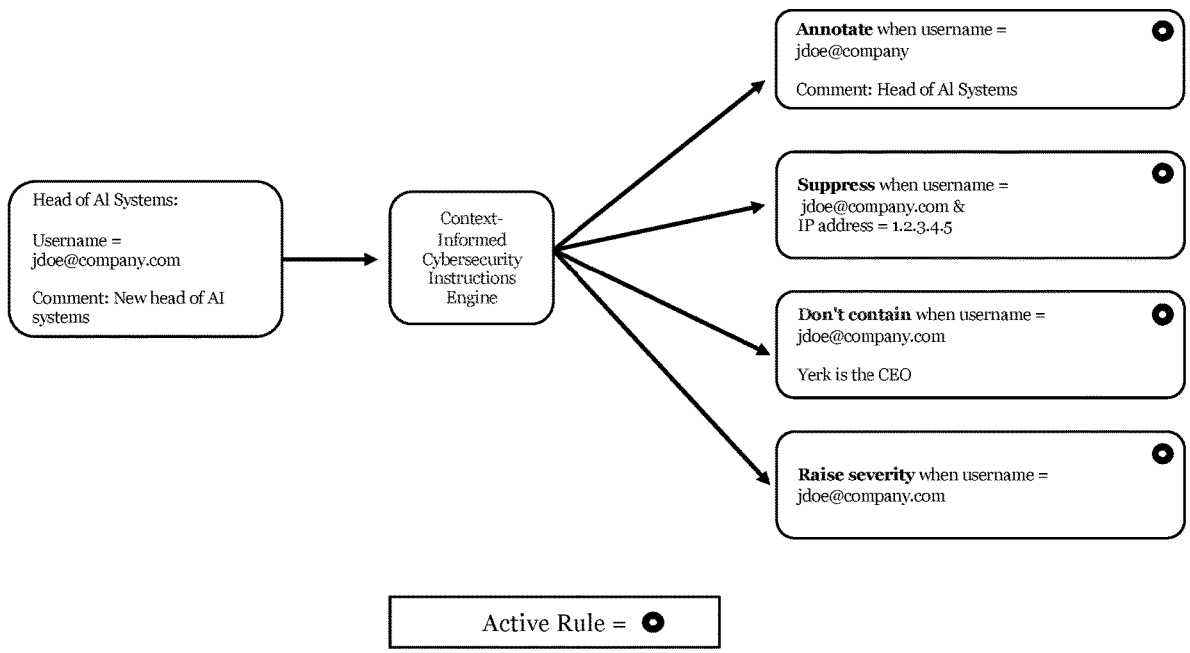
FIG. 20 illustrates exemplarily context-informed cybersecurity event handling instructions based on one or more computing-environment informative data pieces.

Additionally, or alternatively, in another non-limiting example, based on a subset of the plurality of distinct pieces of computing environment-informative data of the subscriber-specific data corpus comprising one or more non-critical cybersecurity entities of the target subscriber, S320 may function to generate a context-informed cybersecurity event handling instruction or a plurality of distinct context-informed cybersecurity event handling instructions that, when executed, causes an automatic suppression of a suspect cybersecurity event that involves the one or more non-critical cybersecurity entities, as shown generally by way of example in FIG. 20.

Additionally, or alternatively, in another non-limiting example, based on a subset of the plurality of distinct pieces of computing environment-informative data of the subscriber-specific data corpus comprising one or more critical cybersecurity entities of the target subscriber, S320 may function to (e.g., simultaneously, in-parallel, automatically, etc.) generate a context-informed cybersecurity event handling instruction that, when executed, causes an automatic escalation of a threat severity level of a suspect cybersecurity event that involves the one or more critical cybersecurity entities and a context-informed cybersecurity event handling instruction that, when executed, automatically activates an automated remediations microservice of the cybersecurity service to automatically remediate or mitigate a suspect cybersecurity event that involves the one or more critical cybersecurity entities. That is, in one or more embodiments, S320 may function to simultaneously generate, by one or more computers, a plurality of distinct context-informed cybersecurity event handling instructions.

It shall be noted that, in one or more embodiments, in response to or based on generating subscriber-specific cybersecurity event handling instructions (e.g., context-informed cybersecurity event handling instructions, computer-executable cybersecurity event handling instructions) for a target subscriber, S320 may function to adapt or augment one or more (e.g., one, a plurality of, etc.) distinct subscriber-agnostic cybersecurity microservices) to include the corresponding subscriber-specific cybersecurity event handling instructions (e.g., context-informed cybersecurity event handling instructions) generated and/or derived by S320. For instance, in a non-limiting example, S320 may function to generate a context-informed cybersecurity event handling instruction that, when executed, automatically activates an automated remediations microservice of the cybersecurity service and S320 may function to adapt or augment a subscriber-agnostic automated remediations microservice to a subscriber-specific automated remediations microservice by including cybersecurity event handling instructions germane or related to the automated remediations microservice (e.g., the context-informed cybersecurity event handling instruction). In another non-limiting example, S320 may function to generate a first context-informed cybersecurity event handling instruction that, when executed, causes an automatic escalation of a threat severity level of a suspect cybersecurity event that involves one or more critical cybersecurity entities and a second context-informed cybersecurity event handling instruction that, when executed, automatically activates an automated remediations microservice of the cybersecurity service, accordingly, S320 may function to adapt or augment a subscriber-agnostic event detection microservice to a subscriber-specific event detection microservice by including the cybersecurity event handling instruction germane or related to the automated event detection microservice (e.g., the context-informed cybersecurity event handling instruction corresponding to event/alert escalation and not the context-informed cybersecurity event handling instruction related to automated event/alert remediation).

Service-Default Cybersecurity Microservices

In one or more embodiments, the cybersecurity event detection and response service (e.g., the system or service 100 implementing the method 300) may interface with a plurality of distinct cybersecurity microservices including, but not limited to, an automated remediations microservice, an automated event/alert suppression microservice, an automated cybersecurity event/alert annotation microservice, and an automated cybersecurity event/alert triaging service, as described above. It shall be recognized that the phrase "cybersecurity microservices" may also be referred to as "service-default cybersecurity microservices", "out-of-the-box cybersecurity microservices", or the like.

In one or more embodiments, an algorithmic structure of each of the plurality of distinct service-default cybersecurity microservices may be pre-configured to include a plurality of distinct computer-executable subscriber-agnostic cybersecurity event/alert handling instructions and a plurality of distinct computer-executable subscriber-specific cybersecurity event/alert handling instructions (e.g., computer-executable context-informed cybersecurity event/alert handling instructions). That is, in such embodiments, the service-default cybersecurity microservices may function to protect digital assets (of subscribers) in a subscriber-agnostic manner and/or a subscriber-specific manner, as described in more detail in S330.

In a non-limiting example, based on S320 identifying that a target subscriber is digitally associated with a computing environment-informative data corpus, the service or system implementing the method 300 may function to evaluate inbound cybersecurity events/alerts against both the computer-executable subscriber-agnostic cybersecurity event/alert handling instructions and the computer-executable subscriber-specific cybersecurity event/alert handling instructions (e.g., computer-executable context-informed cybersecurity event/alert handling instructions) associated with one or more cybersecurity microservices. It shall be recognized that a processing or routing of a cybersecurity event/alert based on the computer-executable subscriber-agnostic cybersecurity event/alert handling instructions may be different than a processing or routing of the cybersecurity event/alert based on the computer-executable subscriber-specific cybersecurity event/alert handling instructions (e.g., computer-executable context-informed cybersecurity event/alert handling instructions).

In another non-limiting example, based on S320 identifying that a target subscriber is not digitally associated with a computing environment-informative data corpus, the service or system implementing the method 300 may function to evaluate inbound cybersecurity events/alerts against the computer-executable subscriber-agnostic cybersecurity event/alert handling instructions and forego evaluating the computer-executable subscriber-specific cybersecurity event/alert handling instructions (e.g., computer-executable context-informed cybersecurity event/alert handling instructions) associated with one or more cybersecurity microservices.

Transforming Subscriber-Agnostic Cybersecurity Microservices to Subscriber-Specific Cybersecurity Microservices In one or more embodiments, S320 may function to (e.g., automatically) obtain and/or derive, by one or more computers, one or more subscriber-specific cybersecurity event handling instructions (e.g., context-informed cybersecurity event handling instructions) for a target subscriber based on one or more pieces of computing environment-informative data included in the computing environment-informative data corpus associated with the target subscriber.

In such embodiments, a distinct set of context-informed cybersecurity event handling instructions may be defined for each service-recognized and/or distinct context-informed category (e.g., high risk, executive user, top priority, cloud environment, etc.) available to be associated with and/or attributed to subject pieces of computing environment-informative data as described above. In such embodiments, via a reference table or any suitable data structure, each distinct context-informed category may be mapped or electronically linked to a distinct set of (implementable) context-informed cybersecurity event handling instructions that, when implemented, may adjust, or tune an operation of one or more cybersecurity microservices. For instance, a first context-informed category (e.g., high risk) may be mapped to a first distinct set of context-informed cybersecurity event handling instructions and a second context-informed category (e.g., executive users) may be mapped to a second distinct set of context-informed cybersecurity event handling instructions.

In a non-limiting example, based on S320 identifying that a target data type (e.g., a username data type) is included in a target context informed category (e.g., high risk), S320 may function to perform a search of the reference mapping data structure based on the target data type (e.g., a username data type) and the target context informed category (e.g., high risk) to identify one or more context-informed cybersecurity instructions stored in the reference mapping data structure that corresponds to the target context informed category (e.g., high risk) and the target data type (e.g., a username data type). In such non-limiting example, S320 may function to adapt or augment at least one distinct subscriber-agnostic cybersecurity microservice to include the one or more context-informed cybersecurity instructions returned from the search (e.g., one of the context-informed cybersecurity instructions returned from the search may relate to a context-informed cybersecurity event handling instructions that, when executed, causes an automatic escalation of a threat severity level of a suspect cybersecurity event that is associated with username cybersecurity entities digitally mapped to high risk attributes).

In a non-limiting example, based on S320 identifying that a target data type (e.g., a hostname) is included in a target context informed category (e.g., top priority), S320 may function performing a search of the reference mapping data structure using the target data type (e.g., the hostname) and the target context informed category (e.g., the top priority) as search parameters to identify one or more context-informed cybersecurity instructions stored in the reference mapping data structure that corresponds to the target context informed category (e.g., top priority) and the target data type (e.g., hostname). In such non-limiting example, S320 may function to adapt or augment at least one distinct subscriber-agnostic cybersecurity microservice to include the one or more context-informed cybersecurity instructions returned from the search (e.g., one of the context-informed cybersecurity instructions returned from the search may relate to a context-informed cybersecurity event handling instruction that, when executed, causes an automatic escalation of a threat severity level of a suspect cybersecurity event that is associated with a hostname cybersecurity entities digitally mapped to top priority attributes).

3.30 Accessing one or more Subscriber-Specific Cybersecurity Microservices|Subscriber-Specific Cybersecurity Microservices S330, which includes accessing one or more subscriber-informed cybersecurity microservices, may function to access one or more subscriber-informed cybersecurity microservices associated with a target subscriber based on identifying a target cybersecurity event or target cybersecurity alert associated with the target subscriber. In one or more embodiments, based on or in response to accessing a subscriber-informed cybersecurity microservice, S330 may function to assess the event features (e.g., event data, event metadata, or the like) of a subject cybersecurity event against computer-executable subscriber-specific cybersecurity event/alert handling instructions and/or computer-executable subscriber-agnostic cybersecurity event/alert handling instructions of the subscriber-informed cybersecurity microservice to accelerate a threat mitigation, a threat escalation, or disposal of the target cybersecurity event. It shall be recognized that the phrase "subscriber-informed cybersecurity microservice" may also be referred to herein as a "subscriber-specific cybersecurity microservice" and vice versa.

It shall be noted that for ease of description in the remainder of S330, disclosure is generally directed accessing one or more subscriber-specific cybersecurity microservices of a target subscriber, however, an analogous technique and description similarly applies for other subscribers to the cybersecurity event detection and response service.

In one or more embodiments, the cybersecurity event detection and response service may receive a target cybersecurity event that includes a plurality of distinct pieces of event data (e.g., event features or the like).

Accordingly, in such embodiments, in response to or based on receiving the target cybersecurity event, S330 may function to instantiate or access a cybersecurity event/alert triage microservice that may function to (e.g., automatically) compute (or determine) a probable degree or level of a threat severity of the target cybersecurity event (e.g., a likely or probable computed degree of threat severity may be set between any two values in a range, such as a value including and/or between 0 and 100, A to Z, and the like, which may inform a degree of threat risk associated with a subject cybersecurity event, or any level between a critical threat severity level and tuning threat severity level).

In one or more embodiments, the cybersecurity event/alert triage microservice may be configured to prioritize attributing or assigning a probable degree or level of threat severity to the target cybersecurity event based on subscriber-specific cybersecurity event handling instructions (e.g., context-informed cybersecurity event handling instructions) of the cybersecurity event/alert triage microservice over subscriber-agnostic cybersecurity event handling instructions (e.g., context-informed cybersecurity event handling instructions) of the cybersecurity event/alert triage microservice.

In a non-limiting example, the cybersecurity event/alert triage microservice may include one or more context-informed cybersecurity event handling instructions (e.g., one or more cybersecurity event handling rules, one or more cybersecurity event handling heuristics, or the like) that, when executed, causes an automatic increase or escalation of a threat severity level of a suspect cybersecurity event that involves any one of the one or more critical cybersecurity entities of a target entity type (e.g., critical usernames, critical hostnames, critical internet protocol (IP) addresses, etc.) included in a computing environment-informative data corpus that corresponds to the subscriber of the suspect cybersecurity event. In such non-limiting example, based on an evaluation or assessment, S330 may function to receive a target cybersecurity event that includes a host event data feature (e.g., jdoe-host) that corresponds to (or matches) a critical host cybersecurity entity included in the computing environment-informative data corpus associated with the subscriber of the target cybersecurity event. Accordingly, S330 may function to automatically escalate or increase, by one or more computers, a threat severity level of the target cybersecurity event based on the event data feature of the target cybersecurity event satisfying execution criterion or criteria of at least one of the one or more context-informed cybersecurity event handling instructions (e.g., assigning, by one or more computing, a critical threat severity level to the target cybersecurity event, assigning, by one or more computers, a high threat severity level to the target cybersecurity event, increasing, by one or more computing, a threat severity level of the target cybersecurity event from a low severity level to a high severity level, or the like).

It shall be noted that, in one or more embodiments, in response to (or based on) the escalation or increase of the threat severity level of the target cybersecurity event, S330 may function to execute an (e.g., automated) cybersecurity investigation and/or perform one or more (e.g., automated) threat mitigation actions to ameliorate or mitigate the threat and/or security risks associated with the target cybersecurity event. It shall be further noted that if the cybersecurity event/alert triage microservice evaluated the target cybersecurity event based on subscriber-agnostic cybersecurity event handling instructions instead of context-informed cybersecurity event handling instructions, the target cybersecurity event may have been computed or determined to be a non-threat and subsequently routed to an event/alert disposal queue and/or assigned a non-critical threat severity level (e.g., a tuning threat severity level, a low threat severity level, a threat severity level below a high or critical threat severity level).

Additionally, or alternatively, in another non-limiting example, the cybersecurity event/alert triage microservice may include one or more context-informed cybersecurity event handling instructions (e.g., cybersecurity event handling rule, cybersecurity handling heuristic, or the like) that, when executed, causes an automatic disposal (or de-escalation of a threat severity level) of a suspect cybersecurity event that involves any one of the one or more non-critical entities of a target entity type (e.g., IP addresses, usernames, hostnames, etc.) included in a computing environment-informative data corpus that corresponds to the subscriber of the suspect cybersecurity event. In such non-limiting example, based on an evaluation or assessment S330 may function to receive a target cybersecurity event that includes an IP address event data feature that corresponds to (or matches) a non-critical IP address included in the computing environment-informative data corpus associated with the subscriber of the target cybersecurity. Accordingly, S330 may function to automatically dispose (or de-escalate), by one or more computers, a threat severity level of the target cybersecurity event based on the event data feature of the target cybersecurity event satisfying execution criterion or criteria of at least one of the one or more context-informed cybersecurity event handling instructions.

It shall be noted that if the cybersecurity event/alert triage microservice evaluated the target cybersecurity event based on subscriber-agnostic cybersecurity event handling instructions instead of context-informed cybersecurity event handling instructions, the target cybersecurity event may have been computed or determined to be a cybersecurity threat and subsequently routed to a cybersecurity incident queue and/or assigned a critical threat severity level to the target cybersecurity event (e.g., a high severity level).

Additionally, or alternatively, in another non-limiting example, the cybersecurity event/alert triage microservice and/or an alert suppression microservice may include one or more context-informed cybersecurity event handling instructions (e.g., cybersecurity event handling rules, cybersecurity event handling heuristics, or the like) that, when executed, causes an automatic suppression of a suspect cybersecurity event that involves any one of the one or more non-critical entities (e.g., non-critical usernames, non-critical hostnames, non-critical internet protocol (IP) addresses, etc.) included in the computing environment-informative data corpus that corresponds to the subscriber of the suspect cybersecurity event. In such non-limiting example, S330 may function to receive a target cybersecurity event that includes a username event data feature (e.g., user1@company.com) that corresponds to (or matches) a non-critical username entity included in the computing environment-informative data corpus associated with a subscriber of the target cybersecurity event based on an evaluation or assessment. Accordingly, S330 may function to automatically suppress or dispose, by one or more computers, the target cybersecurity event as the event data feature (e.g., the username event data feature) of the target cybersecurity satisfies execution criterion or criteria of at least one of the one or more context-informed cybersecurity event handling instructions.

It shall be noted that if the cybersecurity event/alert triage microservice evaluated the target cybersecurity event based on subscriber-agnostic cybersecurity event handling instructions instead of context-informed cybersecurity event handling instructions, the target cybersecurity event may not have been suppressed.

Additionally, or alternatively, in another non-limiting example, the cybersecurity event/alert triage microservice may include one or more context-informed cybersecurity event handling instructions (e.g., cybersecurity event handling rules, cybersecurity event handling heuristics, or the like) that, when executed, automatically activates an automated remediations microservice of the cybersecurity service to automatically remediate or mitigate suspect cybersecurity events that involves any one of the one or more critical cybersecurity entities of a target entity type (e.g., critical usernames, critical hostnames, critical internet protocol (IP) addresses, etc.) included in a computing environment-informative data corpus that corresponds to the subscriber of the suspect cybersecurity event. In such non-limiting example, S330 may function to receive a target cybersecurity event that includes a username event data feature (e.g., user1@company.com) that corresponds to (or matches) a critical username entity included in the computing environment-informative data corpus associated with a subscriber of the target cybersecurity event based on an evaluation or assessment. Accordingly, S330 may function to automatically remediate or mitigate, by one or more computers, the target cybersecurity event by executing one or more automated cybersecurity threat remediation or mitigation actions as the event data feature of the target cybersecurity satisfies execution criterion or criteria of at least one of the one or more context-informed cybersecurity event handling instructions.

It shall be noted that if the cybersecurity event/alert triage microservice evaluated the target cybersecurity event based on subscriber-agnostic cybersecurity event handling instructions instead of context-informed cybersecurity event handling instructions, the target cybersecurity event may not have been automatically remediated.

At least one technical advantage of implementing one or more subscriber-informed cybersecurity microservices may accelerate alert-to remediation, alert-to-triage, bring visibility or focus to cybersecurity events/alerts that may have otherwise been low-priority, disregarded, or the like by subscriber-agnostic cybersecurity event handling instructions, and/or tune an operation of the one or more cybersecurity microservices to accommodate subscriber preferences to how the one or more cybersecurity microservices respond to cybersecurity events.

It shall be further noted that, in one or more embodiments, a target cybersecurity event may include an event feature (e.g., IP address, hostname, etc.) that may satisfy execution criterion or criteria of a plurality of distinct context-informed cybersecurity event handling instructions (e.g., heuristics or the like), and thereby causing, by one or more computers, an automatic execution of each of the plurality of distinct context-informed cybersecurity event handling instructions that may perform a distinct cybersecurity event handling action (e.g., using a plurality of distinct context-informed cybersecurity event handling instructions together to accelerate an event handling of a cybersecurity event (e.g., executing one context-informed cybersecurity event handling instruction to automatically escalate a threat severity level or degree of threat severity of the target cybersecurity event and executing one context-informed cybersecurity event handling instruction to automatically remediate or mitigate a cybersecurity threat associated with the target cybersecurity event)).

3.40 Generating one or more Contextual Intelligence Graphical User Interfaces

S340, which includes generating one or more contextual intelligence graphical user interfaces, may function to automatically generate one or more contextual intelligence graphical user interfaces for a target subscriber in response to or based on the target subscriber having a computing environment-informative data corpus. In one or more embodiments, S340 may function to publish the one or more contextual intelligence graphical user interfaces to the security threat mitigation user interface 130.

In one or more embodiments, based on identifying cybersecurity alerts and/or cybersecurity events, S340 may function to collect the cybersecurity alerts/events (e.g., recently generated alerts and/or events) and store the cybersecurity alerts and/or events in a security alert queue for review and/or evaluation by a security analyst or the like. It shall be noted that a representation of the security alert queue may be displayed on a web-based alert user interface, as shown generally by way of example in FIG. 18. In such embodiments, the web-based alert user interface may include a plurality of distinct selectable representations in which each distinct selectable representation corresponds to a distinct cybersecurity event or cybersecurity alert.

Accordingly, in one or more embodiments, based on or in response to receiving an input selecting a target selectable representation that corresponds to a target cybersecurity event, S340 may function to display, via a cybersecurity event windowpane or the like, the cybersecurity event and the corresponding event features associated with the cybersecurity event.

In a non-limiting example of such embodiments, one piece of event data of the target cybersecurity event may be equivalent to one of the plurality of distinct pieces of computing environment-informative data of a computing environment-informative data corpus associated with the subscriber of the target cybersecurity event. In such non-limiting example, S340 may function to visually emphasize (e.g., highlight, increase text size, etc.) the one piece of event data based on the one piece of event data of the target cybersecurity event matching or being equivalent to one of the plurality of distinct pieces of computing environment-informative data included in the computing environment-informative data corpus, as shown generally by way of example in FIG. 18. It shall be noted that visually emphasizing the one piece of event data may intelligently expose or bring attention (e.g., analyst focus) to critical event features that may accelerate an analyst investigation and/or analyst processing of cybersecurity events.

It shall be recognized that in analogous ways a plurality of distinct pieces of event data of the target cybersecurity event may be emphasized if a plurality of distinct pieces of event data matches or corresponds to a plurality of distinct pieces of computing environment-informative data included in the computing environment-informative data corpus. It shall be further recognized that, in one or more embodiments, S340 may function to visually emphasize the one piece of event data based on an annotation cybersecurity event handling instruction being generated (as generally described above).

Additionally, or alternatively, in one or more embodiments, based on receiving a subscriber input directed to the one piece of event data at the cybersecurity event windowpane, S340 may function to display a cybersecurity intelligence graphical user interface element that includes one or more strings of subscriber-provided text associated with the one piece of event data (e.g., the subscriber-provided or subscriber-informed description of the subject piece of computing environment-informative data received at the context description data field, as described above), as shown generally by way of example in FIG. 19.

Figure 7:
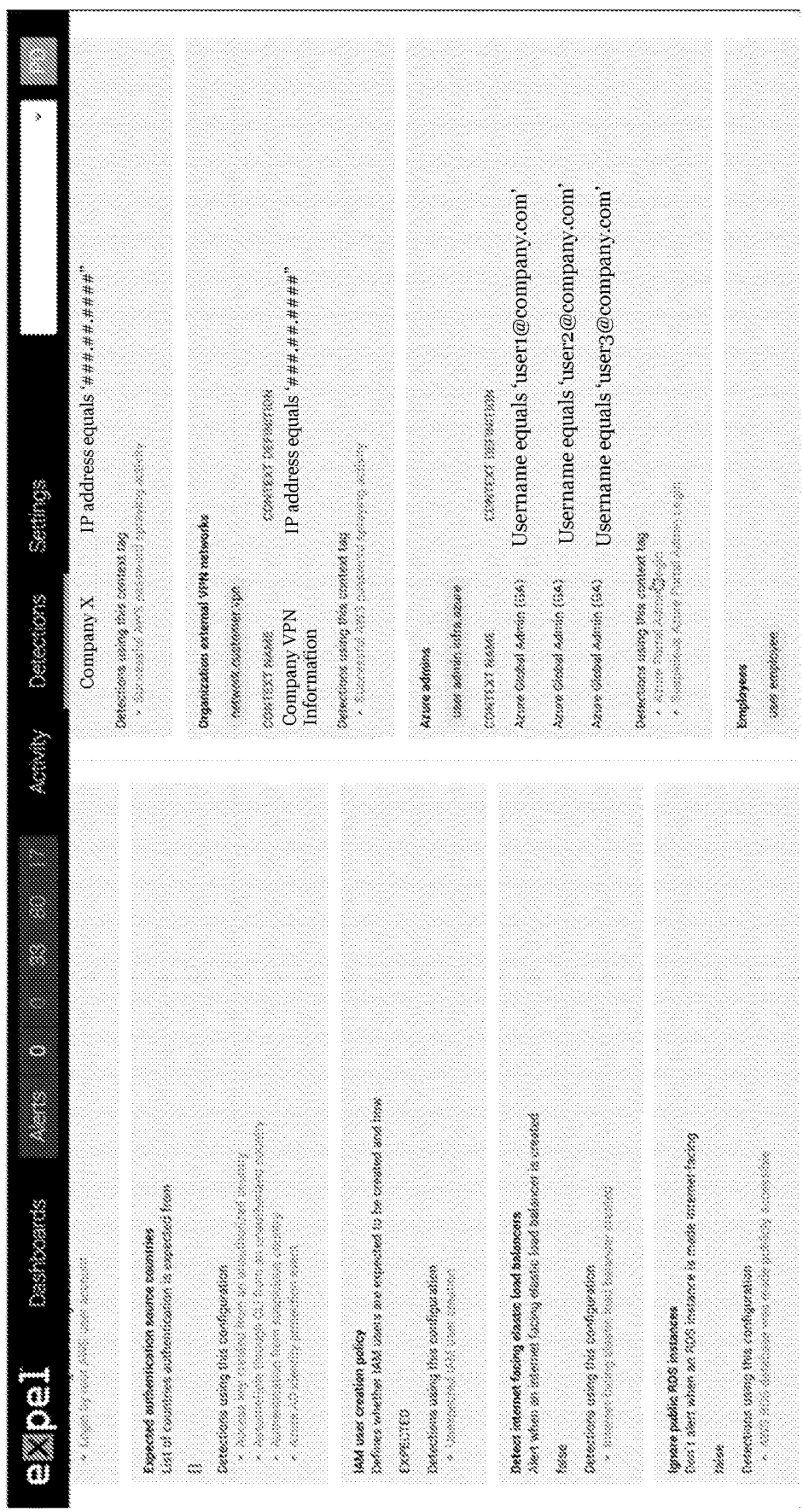
Figure 8:
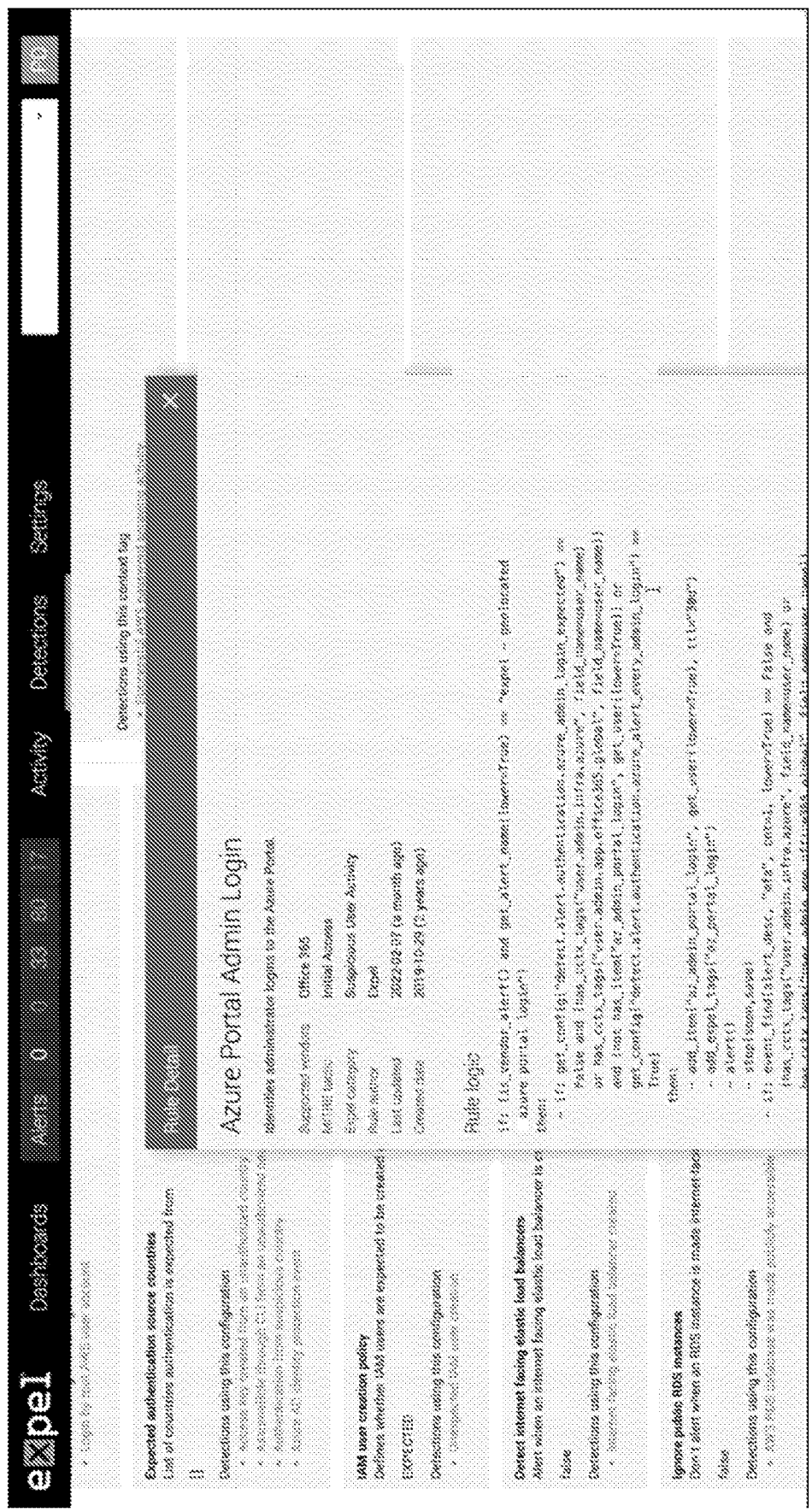

In one or more embodiments, S340 may function to display and generate, by one or more computers, a cybersecurity intelligence graphical user interface comprising a plurality of distinct regions. In such embodiments, a first region of the cybersecurity intelligence graphical user interface may include a first subset of a plurality of distinct pieces of computing environment-informative data of a computing environment-informative data corpus of a target subscriber and at least one selectable hyperlink that, when selected, displays an algorithmic structure of a context-informed cybersecurity event handling instruction generated based on the first subset and/or displays an algorithmic structure of a context-informed cybersecurity event handling instruction using the first subset for processing cybersecurity events, as shown generally by way of example in FIG. 7 and FIG. 8. It shall be noted that in analogous ways the cybersecurity intelligence graphical user interface may include n-number of distinct regions, wherein each distinct region includes n-number of selectable hyperlinks (e.g., a plurality of distinct selectable hyperlinks).

4. Computer-Implemented Method and Computer Program Product

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

We claim:

1. A method for intelligently adapting one or more cybersecurity microservices of a cybersecurity service to accelerate cybersecurity threat mitigation, the method comprising:

constructing a subscriber-specific data corpus comprising a plurality of distinct pieces of computing environment-informative data associated with one or more computing environments of a target subscriber;

adapting a subscriber-agnostic microservice of the cybersecurity service to a subscriber-specific microservice based on the subscriber-specific data corpus, wherein:

(1) the subscriber-agnostic microservice includes a plurality of distinct subscriber-agnostic cybersecurity event handling instructions, and (2) the adapting the subscriber-agnostic microservice to the subscriber-specific microservice includes:

(2-a) generating a plurality of distinct context-informed cybersecurity event handling instructions based on at least a subset of the plurality of distinct pieces of computing environment-informative data of the target subscriber; and (2-b) augmenting the subscriber-agnostic microservice to include the plurality of distinct context-informed cybersecurity event handling instructions;

routing, to the subscriber-specific microservice, a target cybersecurity event that includes a plurality of distinct pieces of event data; and based on the routing, computing for the target cybersecurity event one of:

(i) a subscriber-specific threat severity level based on one or more of the plurality of distinct context-informed cybersecurity event handling instructions if at least one piece of event data of the target cybersecurity event is equivalent to one of the plurality of distinct pieces of computing environment-informative data of the subscriber-specific data corpus; and (ii) a subscriber-agnostic threat severity level based on one or more of the plurality of distinct subscriber-agnostic cybersecurity event handling instructions if each piece of event data of the plurality of distinct pieces of event data is excluded from the subscriber-specific data corpus; and executing, by one or more computers, a threat mitigation action or threat disposal action that resolves or mitigates a threat of the target cybersecurity event based on the computing of the subscriber-specific threat severity level or the subscriber-agnostic threat severity level for the target cybersecurity event.

2. The method according to claim 1, wherein:

a subset of the plurality of distinct pieces of computing environment-informative data of the subscriber-specific data corpus includes one or more critical cybersecurity entities of the target subscriber; and the generating the plurality of distinct context-informed cybersecurity event handling instructions includes creating at least one cybersecurity event handling instruction that, when executed, causes an automatic escalation of a threat severity level of a suspect cybersecurity event that involves the one or more critical cybersecurity entities.

3. The method according to claim 1, wherein:

a subset of the plurality of distinct pieces of computing environment-informative data of the subscriber-specific data corpus includes one or more non-critical cybersecurity entities of the target subscriber; and the generating the plurality of distinct context-informed cybersecurity event handling instructions includes creating at least one cybersecurity event handling instruction that, when executed, causes an automatic de-escalation of a threat severity level of a suspect cybersecurity event that involves the one or more non-critical cybersecurity entities.

4. The method according to claim 1, wherein:

a subset of the plurality of distinct pieces of computing environment-informative data of the subscriber-specific data corpus includes one or more temporary user location adjustments for one or more digital users associated with the target subscriber; and the generating the plurality of distinct context-informed cybersecurity event handling instructions includes creating at least one ephemeral cybersecurity event handling instruction that, when executed, causes an automatic escalation or de-escalation of a threat severity level of a suspect cybersecurity event that involves the one or more temporary location adjustments.

5. The method according to claim 1, wherein:

a subset of the plurality of distinct pieces of computing environment-informative data of the subscriber-specific data corpus includes one or more critical cybersecurity entities of the target subscriber; and the generating the plurality of distinct context-informed cybersecurity event handling instructions includes creating at least one cybersecurity event handling instruction that, when executed, automatically activates an automated remediations microservice of the cybersecurity service that automatically remediates or mitigates a suspect cybersecurity event that involves the one or more critical cybersecurity entities.

6. The method according to claim 1, wherein:

a subset of the plurality of distinct pieces of computing environment-informative data of the subscriber-specific data corpus includes one or more non-critical cybersecurity entities of the target subscriber; and the generating the plurality of distinct context-informed cybersecurity event handling instructions includes creating at least one cybersecurity event handling instruction that, when executed, causes an automatic suppression of a suspect cybersecurity event that involves the one or more non-critical cybersecurity entities.

7. The method according to claim 1, wherein:

one piece of event data of the target cybersecurity event is equivalent to one of the plurality of distinct pieces of computing environment-informative data of the subscriber-specific data corpus, the method further includes:

displaying, via a web-accessible user interface, the target cybersecurity event that includes the plurality of distinct pieces of event data; and visually emphasizing the one piece of event data based on the one piece of event data being equivalent to the one of the plurality of distinct pieces of computing environment-informative data of the subscriber-specific data corpus.

8. The method according to claim 7, wherein:

each distinct piece of computing environment-informative data of the plurality of distinct pieces of computing environment-informative data includes one or more strings of subscriber-informed text, the method further comprising:

based on receiving a subscriber input directed to the one piece of event data, displaying a contextual intelligence graphical user interface that is overlaid on the web-accessible user interface that includes the one or more strings of subscriber-informed text associated with the one piece of event data.

9. The method according to claim 8, further comprising:

mitigating, via an execution of one or more cybersecurity threat mitigation actions, a threat of the target cybersecurity event based on an evaluation of the contextual intelligence graphical user interface.

10. The method according to claim 8, further comprising:
routing the target cybersecurity event to a cybersecurity event disposal queue based on an evaluation of the contextual intelligence graphical user interface.

11. A method for intelligently adapting one or more cybersecurity microservices of a cybersecurity service to accelerate cybersecurity threat mitigation, the method comprising:
identifying a subscriber-specific data corpus comprising a plurality of distinct pieces of computing environment-informative data associated with one or more computing environments of a target subscriber;
adapting a subscriber-agnostic microservice of the cybersecurity service to a subscriber-specific microservice based on the subscriber-specific data corpus, wherein:
(1) the subscriber-agnostic microservice includes a plurality of distinct subscriber-agnostic cybersecurity event handling instructions, and
(2) the adapting the subscriber-agnostic microservice to the subscriber-specific microservice includes:
(2-a) generating a plurality of distinct context-informed cybersecurity event handling instructions based on at least a subset of the plurality of distinct pieces of computing environment-informative data of the target subscriber; and
(2-b) augmenting the subscriber-agnostic microservice to include the plurality of distinct context-informed cybersecurity event handling instructions;
accessing the subscriber-specific microservice based on identifying a target cybersecurity event that includes a plurality of distinct pieces of event features, wherein the accessing includes assessing a subset of the plurality of distinct pieces of event features against the context-informed cybersecurity event handling instructions; and
automatically executing one or more of the plurality of distinct context-informed cybersecurity event handling instructions based on the assessment that resolves or mitigates a threat of the target cybersecurity event.

12. The method according to claim 11, wherein
automatically executing the one or more of the plurality of distinct context-informed cybersecurity event handling instructions is further based on at least one event feature of the target cybersecurity event being equivalent to one of the plurality of distinct pieces of computing environment-informative data of the subscriber-specific data corpus.

13. The method according to claim 11, further comprising:
constructing the subscriber-specific data corpus during an enrollment of the target subscriber to the cybersecurity service, wherein the constructing includes:
(a) sourcing the plurality of distinct pieces of computing environment-informative data via one or more graphical user interfaces of the cybersecurity service;
(b) attributing a data context type to each distinct piece of computing environment-informative data sourced from the one or more graphical user interfaces of the cybersecurity service; and
(c) assigning one or more subscriber-informed environment context attributes to each distinct piece of computing environment-informative data sourced from the one or more graphical user interfaces of the cybersecurity service.

14. The method according to claim 13, further comprising:
augmenting the subscriber-specific data corpus to include an additional piece of computing environment-informative data based on a cybersecurity investigation of a target cybersecurity alert; and
augmenting the subscriber-specific microservice to include an additional context-informed cybersecurity event handling instruction based on the additional piece of computing environment-informative data.

15. The method according to claim 11, further comprising:
displaying, by one or more computers, a cybersecurity intelligence graphical user interface, wherein a first distinct region of the cybersecurity intelligence graphical user interface includes:
(A) a first subset of the plurality of distinct pieces of computing environment-informative data of the subscriber-specific data corpus; and
(B) a first selectable hyperlink that, when selected, displays an algorithmic structure of one of the plurality of distinct context-informed cybersecurity event handling instructions generated based on the first subset.

16. The method according to claim 15, wherein:
the cybersecurity intelligence graphical user interface further includes a second distinct region, wherein the second distinct region includes:
(A) a second subset of the plurality of distinct pieces of computing environment-informative data of the subscriber-specific data corpus; and
(B) a second selectable hyperlink that, when selected, displays an algorithmic structure of one of the plurality of distinct context-informed cybersecurity event handling instructions that corresponds to the second subset.

17. The method according to claim 11, wherein:
a subset of the plurality of distinct pieces of computing environment-informative data of the subscriber-specific data corpus includes one or more critical cybersecurity entities of the target subscriber; and
the generating the plurality of distinct context-informed cybersecurity event handling instructions includes creating at least one cybersecurity event handling instruction that, when executed, causes an automatic escalation of a suspect cybersecurity event that involves the one or more critical cybersecurity entities.

18. The method according to claim 17, wherein:
a subset of the plurality of distinct pieces of computing environment-informative data of the subscriber-specific data corpus includes one or more non-critical cybersecurity entities of the target subscriber; and
the generating the plurality of distinct context-informed cybersecurity event handling instructions further includes creating at least one cybersecurity event handling instruction that, when executed, causes an automatic de-escalation a suspect cybersecurity event that involves the one or more non-critical cybersecurity entities.

19. The method according to claim 18, wherein:
the generating the plurality of distinct context-informed cybersecurity event handling instructions further includes creating at least one cybersecurity event handling instruction that, when executed, automatically remediates, or mitigates the suspect cybersecurity event that involves the one or more critical cybersecurity entities.

20. A computer-implemented method for intelligently adapting one or more cybersecurity microservices of a cybersecurity service to accelerate cybersecurity threat mitigation, the method comprising:

constructing, by one or more computers, a subscriber-specific data corpus comprising a plurality of distinct pieces of computing environment-informative data associated with one or more computing environments of a target subscriber;

automatically transforming, by the one or more computers, a subscriber-agnostic cybersecurity event detection microservice of the cybersecurity service to a subscriber-specific cybersecurity event detection microservice based on the subscriber-specific data corpus, wherein the transforming the subscriber-agnostic microservice to the subscriber-specific microservice includes installing a plurality of distinct context-informed cybersecurity event handling instructions into the subscriber-agnostic cybersecurity event detection microservice;

accessing the subscriber-specific microservice based on identifying a target cybersecurity event that includes a plurality of distinct pieces of event features, wherein the accessing includes assessing a subset of the plurality of distinct pieces of event features against the context-informed cybersecurity event handling instructions; and automatically executing, by the one or more computers, one or more of the plurality of distinct context-informed cybersecurity event handling instructions based on the assessment to resolve or mitigate a threat of the target cybersecurity event.

\* \* \* \* \*